(12) United States Patent
Huang et al.

(10) Patent No.: US 12,445,634 B2
(45) Date of Patent: Oct. 14, 2025

(54) MULTIPLE HYPOTHESIS PREDICTION FOR VIDEO CODING

(71) Applicant: QUALCOMM Incorporated, San Diego, CA (US)

(72) Inventors: Han Huang, San Diego, CA (US); Kevin Reuze, Rennes (FR); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 580 days.

(21) Appl. No.: 17/644,519

(22) Filed: Dec. 15, 2021

(65) Prior Publication Data

US 2022/0201322 A1 Jun. 23, 2022

Related U.S. Application Data

(60) Provisional application No. 63/130,232, filed on Dec. 23, 2020.

(51) Int. Cl.
*H04N 19/44* (2014.01)
*H04N 19/109* (2014.01)
(Continued)

(52) U.S. Cl.
CPC ........... *H04N 19/44* (2014.11); *H04N 19/109* (2014.11); *H04N 19/137* (2014.11);
(Continued)

(58) Field of Classification Search
None
See application file for complete search history.

(56) References Cited

U.S. PATENT DOCUMENTS

2019/0246114 A1\* 8/2019 Tourapis ............... H04N 19/567
2020/0275112 A1\* 8/2020 Chiang ................ H04N 19/107
(Continued)

FOREIGN PATENT DOCUMENTS

WO 2017197146 A1 11/2017
WO 2019199953 A1 10/2019
(Continued)

OTHER PUBLICATIONS

Abdoli M., et al., "Non-CE3: Decoder-Side Intra Mode Derivation with Prediction Fusion Using Planar", JVET-O0449-2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.
(Continued)

*Primary Examiner* — Mohammed Jebari
(74) *Attorney, Agent, or Firm* — Shumaker & Sieffert, P.A.

(57) ABSTRACT

An example device for decoding video data includes one or more processors configured to: determine that a first weight and a second weight are specified for a bi-prediction mode predicted current block of video data; determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block.

34 Claims, 8 Drawing Sheets

BI-PREDICTION WITH NON-EQUAL WEIGHTS

MULTI-HYPOTHESIS PREDICTION

(51) Int. Cl.
*H04N 19/137* (2014.01)
*H04N 19/159* (2014.01)
*H04N 19/176* (2014.01)
*H04N 19/52* (2014.01)
*H04N 19/573* (2014.01)
*H04N 19/577* (2014.01)

(52) U.S. Cl.
CPC ......... *H04N 19/159* (2014.11); *H04N 19/176* (2014.11); *H04N 19/52* (2014.11); *H04N 19/573* (2014.11); *H04N 19/577* (2014.11)

(56) References Cited

U.S. PATENT DOCUMENTS

| | | | | |
|---|---|---|---|---|
| 2020/0275115 | A1* | 8/2020 | Chiang | H04N 19/44 |
| 2021/0006803 | A1* | 1/2021 | Zhang | H04N 19/184 |
| 2021/0227250 | A1* | 7/2021 | Liu | H04N 19/105 |
| 2021/0266587 | A1* | 8/2021 | Liu | H04N 19/147 |
| 2021/0344909 | A1* | 11/2021 | Liu | H04N 19/52 |
| 2022/0060688 | A1* | 2/2022 | Galpin | H04N 19/463 |
| 2022/0060701 | A1* | 2/2022 | Bordes | H04N 19/132 |
| 2022/0312001 | A1* | 9/2022 | Chen | H04N 19/105 |
| 2023/0232037 | A1* | 7/2023 | Galpin | H04N 19/593 |
| | | | | 375/240.16 |

FOREIGN PATENT DOCUMENTS

| | | |
|---|---|---|
| WO | 2020084508 A1 | 4/2020 |
| WO | 2020118247 A1 | 6/2020 |
| WO | 2020132168 A1 | 6/2020 |
| WO | 2020163709 A1 | 8/2020 |

OTHER PUBLICATIONS

Bossen F., et al., "VTM Common Test Conditions and Software Reference Configurations for SDR Video", JVET-T2010-v1, Joint Video Experts Team (JVET) of ITU-T SG 16 WP 3 and ISO/IEC JTC 1/SC 29, 20th Meeting, by teleconference, Oct. 7-16, 2020, pp. 1-7.
Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or Iso/Iec JTC1/SC29/WG11 and JVET of ITU-T SG 16 WP 3 and ISO/IEC JTC 1/SC 29/WG 11), No. m53983, JVET-R2001-v8, May 6, 2020 (May 6, 2020), XP030287934, 524 pages, Retrieved from the Internet: URL: http://phenix.int-evry.fr/mpeg/doc_end_user/documents/130_Alpbach/wg11/m53983-JVET-R2001-v8-JVET-R2001-v8.zip JVET-R2001-v8.docx.
Chang Y-J., et al., "Compression Efficiency Methods Beyond VVC", JVET-U0100, Joint Video Experts Team (JVET) of ITU-T SG 16 WP 3 and ISO/IEC JTC 1/SC 29, 21st Meeting, by teleconference, Jan. 6-15, 2021, pp. 1-13.
Chang Y-J., et al., "EE2: Tests of Compression Efficiency Methods Beyond VVC", JVET-V0120-v2, Joint Video Experts Team (JVET) of ITU-T SG 16 WP 3 and ISO/IEC JTC 1/SC 29, 22nd Meeting, by teleconference, Apr. 20-28, 2021, pp. 1-31.
Chen Y., et al., "Description of SDR, HDR and 360° Video Coding Technology Proposal by Qualcomm and Technicolor—Low and High Complexity Versions", JVET-J0021-, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.
Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.
Henry F., et al., "Residual Coefficient Sign Prediction", 4th JVET Meeting; Oct. 15, 2016-Oct. 21, 2016; Chengdu; (The Joint Video Exploration Team of ISO/IEC JTC1/SC29/WG11 and ITU-T SG.16 Wg 3); URL: http://phenix.int-evry.fr/jvet/, No. JVET-D0031, Oct. 20, 2016 (Oct. 20, 2016), JVET-D0031-v4, XP030150258, pp. 1-6.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Li G., et al., "CE2-2.2: Affine Merge with Prediction Offset", JVET-N0378, Joint Video Experts Team (JVET) of ITU-T SG 16 WP 3 and ISO/IEC JTC 1/SC 29/WG 11, 14th Meeting: Geneva, CH, Mar. 17-29, 2019, pp. 1-5.
Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7.
Ray B., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-7, Jan. 8, 2020 (Jan. 8, 2020), m51986, XP030223398, Retrieved from the Internet: URL:http://phenix.int-evry.fr/jvet/doc_end_user/documents/17_Brussels/wg11/JVET-Q0391-v3.zip, JVET-Q0391-v3/JVET-Q0391-v3.docx [retrieved on Jan. 8, 2020].
Schwarz H., et al., "Additional Support of Dependent Quantization with 8 States", JVET-Q0243-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-12.
Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting: Gothenburg, SE, Jul. 3-12, 2019, pp. 1-5.
Seregin V., et al., "Exploration Experiment on Enhanced Compression beyond VVC Capability", JVET-U2024-v2, Joint Video Experts Team (JVET) of ITU-T SG 16 WP 3 and ISO/IEC JTC 1/SC 29, 21st Meeting, by teleconference, Jan. 6-15, 2021, pp. 1-19.
Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-14.
Winken M.., et al., "CE10: Multi-Hypothesis Inter Prediction (Tests 1.2.a-1.2.c)", JVET-L0148-v3, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-12.
Winken M., et al., "CE10: Multi-Hypothesis Inter Prediction (Tests 1.5-1.8)", JVET-K0269-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-14.
Winken M.., et al., "Multi-Hypothesis Inter Prediction", JVET-J0041-v2, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-10.
Zhang K., et al., "Enhanced Cross-Component Linear Model Intra-Prediction", JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.
Zhao L., et al., "Non-CE: Weighted Intra and Inter Prediction Mode", Joint Video Experts Team (JVET) of ITU-T SG 16 WP 3 and ISO/IEC JTC 1/SC 29/WG 11, JVET-O0537, 15th Meeting: Gothenburg, SE, Jul. 3-12, 2019, Doc: JVET-O0537, pp. 1-6.
Zhao X., et al., "Six Tap Intra Interpolation Filter," JVET Meeting; 4th Meeting; Chengdu, CN, (The Joint Video Exploration Team of ISO/IEC JTC1/SC29/WG11 and ITU-T SG.16/WG11); Oct. 15-21, 2016, No. JVET-D0119r1, pp. 1-3.
Chen J., et al., "Algorithm Description for Versatile Video Coding and Test Model 11 (VTM 11)", 20th JVET Meeting, Oct. 7, 2020-Oct. 16, 2020, Teleconference, (The Joint Video Exploration Team of ISO/IEC JTC1/SC29/WG11 and ITU-T SG.16), No. JVET-T2002-v1, 132. MPEG Meeting, Oct. 12, 2020-Oct. 16, 2020,

(56) References Cited

OTHER PUBLICATIONS

Online, (Motion Picture Expert Group or ISO/IEC JTC1/SC29/WG11), No. m55626, Dec. 14, 2020 (Dec. 14, 2020), XP030293335, pp. 1-102, JVET-T2002-v1.docx [retrieved on Dec. 14, 2020].
International Search Report and Written Opinion—PCT/US2021/063856—ISA/EPO—Mar. 21, 2022, 19 pp.

* cited by examiner

MULTIPLE HYPOTHESIS PREDICTION FOR VIDEO CODING

This application claims the benefit of U.S. Provisional Application No. 63/130,232, filed Dec. 23, 2020, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter-prediction in video coding (encoding and decoding). In particular, these techniques relate to multiple hypothesis prediction. In video coding, video is represented by a series of pictures. Each picture may be partitioned into blocks, and each block may be individually coded. In general, a block is coded using a prediction block and a residual block. A video coder may generally form the prediction block according to inter-prediction (relative to previously coded pictures) or intra-prediction (relative to previously coded blocks of the same picture). In inter-prediction, blocks may be predicted using uni-directional (one motion vector) or bi-directional (two motion vectors) prediction. Furthermore, in inter-prediction, blocks may be predicted using multi-hypothesis prediction, that is, using more than two motion vectors.

In one example, a method of decoding video data includes determining that a first weight and a second weight are specified for a current block of video data that is inter-prediction coded using bi-prediction mode, wherein the first weight is different than the second weight; in response to determining that the first weight and the second weight are specified, determining whether the current block is to be predicted using multi-hypothesis prediction (MHP) mode with the bi-prediction mode as a base mode; in response to determining that the current block is to be predicted using the MHP mode with the bi-prediction mode as the base mode, determining an additional inter-prediction mode of the MHP mode; generating a first prediction block according to the bi-prediction mode; generating a second prediction block according to the additional inter-prediction mode; generating a final prediction block for the current block according to the MHP mode using the first prediction block and the second prediction block; and decoding the current block using the final prediction block.

In another example, a device for decoding video data includes: a memory configured to store video data; and one or more processors implemented in circuitry and configured to: determine that a first weight and a second weight are specified for a current block of video data that is inter-prediction coded using bi-prediction mode, wherein the first weight is different than the second weight; in response to determining that the first weight and the second weight are specified, determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block.

In another example, a computer-readable storage medium has stored thereon instructions that, when executed, cause a processor to: determine that a first weight and a second weight are specified for a current block of video data that is inter-prediction coded using bi-prediction mode, wherein the first weight is different than the second weight; in response to determining that the first weight and the second weight are specified, determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block. Fig.

In another example, a device for decoding video data includes means for determining that a first weight and a second weight are specified for a current block of video data that is inter-prediction coded using bi-prediction mode, wherein the first weight is different than the second weight; means for determining whether the current block is to be predicted using multi-hypothesis prediction (MHP) mode with the bi-prediction mode as a base mode in response to determining that the first weight and the second weight are specified; means for determining an additional inter-prediction mode of the MHP mode in response to determining that the current block is to be predicted using the MHP mode with the bi-prediction mode as the base mode; means for generating a first prediction block according to the bi-prediction mode; means for generating a second prediction block according to the additional inter-prediction mode; means for generating a final prediction block for the current block according to the MHP mode using the first prediction block and the second prediction block; and means for decoding the current block using the final prediction block.

The details of one or more examples are set forth in the accompanying drawings and the description below. Other features, objects, and advantages will be apparent from the description, drawings, and claims.

DETAILED DESCRIPTION

Figure 1:
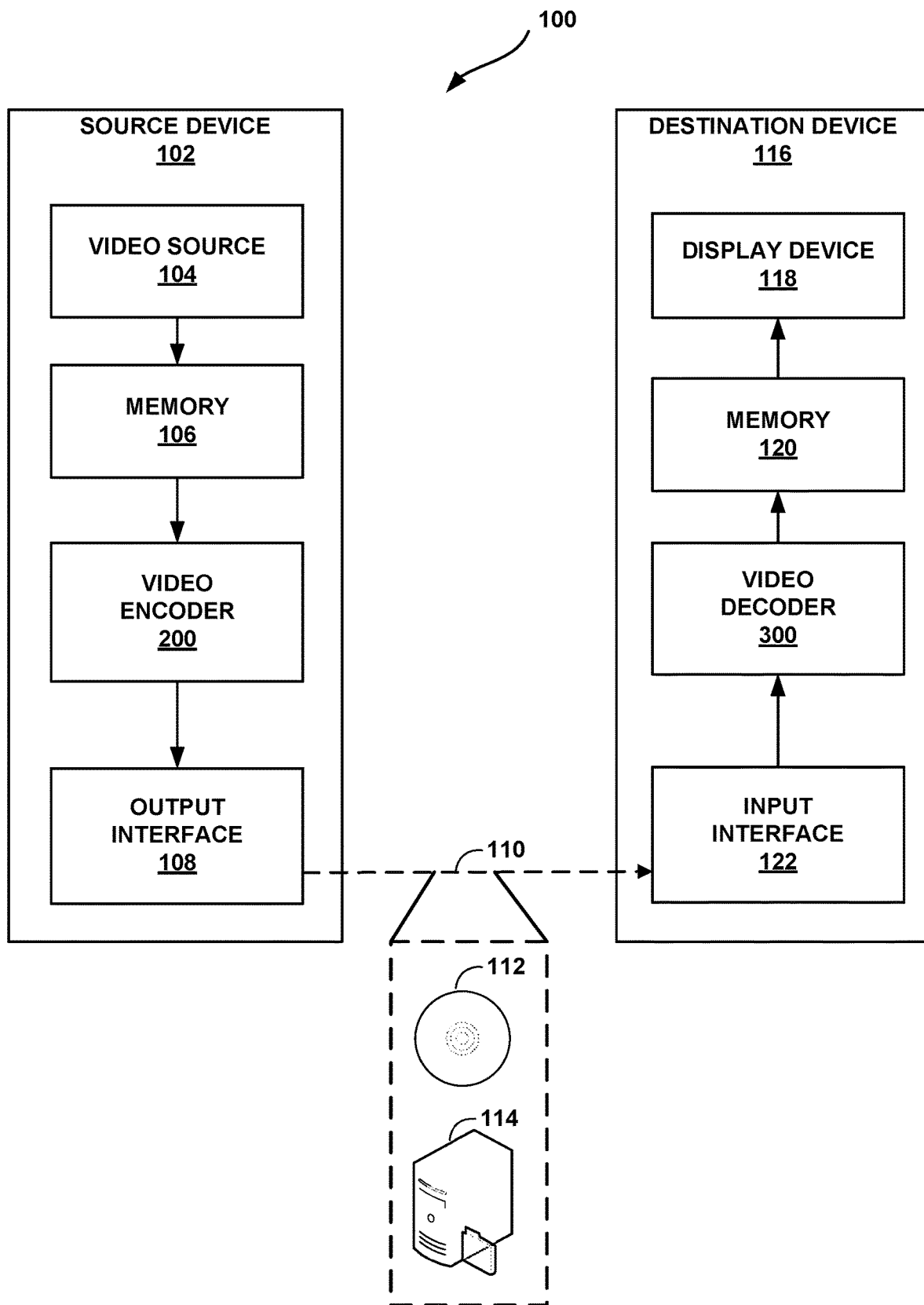
FIG. 1 is a block diagram illustrating an example video encoding and decoding system that may perform the techniques of this disclosure.

In video coding, video is represented by a series of pictures. Each picture may be partitioned into blocks, and each block may be individually coded. In general, a block is coded using a prediction block and a residual block. A video coder may generally form the prediction block according to inter-prediction (relative to previously coded pictures) or intra-prediction (relative to previously coded blocks of the same picture). In inter-prediction, blocks may be predicted using uni-directional (one motion vector) or bi-directional (two motion vectors) prediction.

The video coder may further code the motion vectors, e.g., using merge mode or advanced motion vector prediction (AMVP) mode. In merge mode, the video coder codes a merge candidate, representing a neighboring block to the current block from which to infer motion information for the motion vector (e.g., a reference picture index, a reference picture list, and the motion vector itself, e.g., an x-component and a y-component of the motion vector). The x-component represents horizontal displacement for the motion vector, while the y-component represents vertical displacement for the motion vector. In AMVP mode, the video coder codes a motion vector prediction candidate, representing a neighboring block to the current block from which to predict the motion vector, along with motion vector difference (MVD) information representing offsets to apply to the x- and y-components of the motion vector prediction candidate. In AMVP, the video coder also explicitly codes the reference picture identifying information, e.g., the reference picture index and reference picture list.

In ITU-T H.265/High Efficiency Video Coding (HEVC), the video coder codes MVD values (that is, the differences between a motion vector predictor and the motion vector for a current CU) in units of quarter-luma samples (when sub-pixel precision is enabled, e.g., when "use_integer_mv_flag" has a value of 0 in a slice header). ITU-T H.266/Versatile Video Coding (VVC) introduced a CU-level adaptive motion vector resolution (AMVR) scheme that allows the MVD of a CU to be coded in different precisions. Depending on the mode (normal AMVP mode or affine AMVP mode) for the current CU, the video coder may adaptively select the MVD resolution according to VVC as follows: in normal AMVP mode, the video coder may select from quarter-luma samples, half-luma samples, integer-luma samples, or four-luma samples; in affine AMVP mode, the video coder may select from $1/16$-luma samples, quarter-luma samples, or integer-luma samples.

In VVC, for a CU that has at least one non-zero MVD component, a video coder may code a first flag to indicate whether quarter-luma-sample MVD precision is used for the CU. If the first flag is 0, no further signaling is needed and quarter-luma-sample MVD precision is used for the current CU. Otherwise, the video coder may code a second flag to indicate whether half-luma-sample or another MVD precision (integer or four-luma sample) is used for the normal AMVP CU. In the case of half-luma-sample, the video coder may apply a 6-tap interpolation filter instead of a default 8-tap interpolation filter for the half-luma sample position. Otherwise, the video coder may code a third flag to indicate whether integer-luma-sample or four-luma-sample MVD precision is used for a normal AMVP CU.

In the case of an affine AMVP CU in VVC, the video coder may use a second flag to indicate whether integer-luma-sample or $1/16$ luma-sample MVD precision is used. In order to ensure that the reconstructed MV has the intended precision (quarter-luma-sample, half-luma-sample, integer-luma-sample or four-luma-sample), the video coder may round motion vector predictor for the CU to the same precision as that of the MVD before adding the motion vector predictor together with the MVD. The video coder may round the motion vector predictors toward zero (that is, a negative motion vector predictor is rounded toward positive infinity and a positive motion vector predictor is rounded toward negative infinity).

In HEVC, a video coder generates a bi-prediction signal by averaging two prediction signals obtained from two different reference pictures and/or using two different motion vectors. In VVC, the bi-prediction mode is extended beyond simple averaging to allow weighted averaging of the two prediction signals, e.g., as follows:

$$P_{bi\text{-}pred} = ((8-w)*P_0 + w*P_1 + 4) >> 3$$

In VVC, five weights w are allowed in the weighted averaging bi-prediction, $w \in \{-2, 3, 4, 5, 10\}$. For each bi-predicted coding unit (CU, that is, block), the weight w is determined in one of two ways: 1) for a non-merge CU, the video coder codes data representing a weight index following the motion vector difference data in the bitstream; 2) for a merge CU, the video coder infers the weight index from neighbouring blocks based on the merge candidate index. In VVC, bi-prediction with CU-level weighting (BCW) is only applied to CUs with 256 or more luma samples (i.e., CU width times CU height is greater than or equal to 256). For low-delay pictures, all 5 weights are used. For non-low-delay pictures, only 3 weights (w∈{3, 4, 5}) are used.

Furthermore, in inter-prediction, blocks may be predicted using multi-hypothesis prediction, that is, using more than two motion vectors. Multiple hypothesis prediction (MHP) has been described in:

Winken et al., "Multi-hypothesis Inter-prediction," Joint Video Experts Team (JVET) of ITU-T SG 16 WP 3 and ISO/IEC JTC 1/SC 29/WG 11, 10th Meeting: San Diego, US, 10-20 Apr. 2018, Document JVET-J0041-v2;

Winken et al., "CE10: Multi-Hypothesis Inter Prediction (Tests 1.5-1.8)," Joint Video Experts Team (JVET) of ITU-T SG 16 WP 3 and ISO/IEC JTC 1/SC 29/WG 11, 11th Meeting: Ljubljana, S I, 10-18 Jul. 2018, Document JVET-K0269;

Winken et al., "CE10: Multi-Hypothesis Inter Prediction (Tests 1.2.a-1.2.c)," Joint Video Experts Team (JVET) of ITU-T SG 16 WP 3 and ISO/IEC JTC 1/SC 29/WG 11, 12th Meeting: Macao, C N, 3-12 Oct. 2018, Document JVET-L0148-v3; and Winken et al., "CE10: Multi-hypothesis inter prediction (Test 10.1.2)," Joint Video Experts Team (JVET) of ITU-T SG 16 WP 3 and ISO/IEC JTC 1/SC 29/WG 11, 13th Meeting: Marrakech, M A, 9-18 Jan. 2019, Document JVET-M0425-v2.

In MHP, an inter prediction technique allows weighted superposition of more than two motion-compensated prediction signals (e.g., using more than two motion vectors). A video coder may obtain the resulting overall prediction signal by sample-wise weighted superposition. With the uni/bi prediction signal $p_{uni/bi}$, the first additional inter prediction signal/hypothesis $h_3$, and a weighting factor $\alpha$, the video coder may obtain the resulting prediction signal $p_3$ as follows:

$$p_3 = (1-\alpha)p_{uni/bi} + \alpha h_3$$

According to MHP, the video coder may code data for weighting factor $\alpha$ in a syntax element add_hyp_weight_idx, e.g., according to the following mapping of Table 1:

TABLE 1

| add_hyp_weight_idx | α |
|---|---|
| 0 | 1/4 |
| 1 | −1/8 |

Analogous to the techniques discussed above, the video coder may use more than one additional prediction signal. The video coder may iteratively accumulate the resulting overall prediction signal with each additional prediction signal, as follows:

$$p_{n+1} = (1-\alpha_{n+1})p_n + \alpha_{n+1} h_{n+1}$$

The video coder may obtain the resulting overall prediction signal as the last $p_n$ (i.e., the $p_n$ having the largest index n).

For inter prediction blocks using merge mode (but not SKIP mode) according to these conventional MHP techniques, the video coder may also specify additional inter prediction signals. For the additional prediction signals, the video coder may use one of two AMVP candidate lists:

If the picture order count (POC) of the reference picture of the additional prediction signal equals the POC of the used list1 reference picture, the video coder may use the list1 AMVP candidate list.

Otherwise, the video coder may use the list0 AMVP candidate list.

This disclosure recognizes that the conventional MHP signaling described above can be improved. The techniques of this disclosure may achieve improvements in video coding relating to the use of MHP, in that these techniques may reduce signaling overhead, reduce processing requirements, and/or improve data fidelity by increasing prediction accuracy for motion vector predictors and/or prediction blocks.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding data for multi-hypothesis prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding data for multi-hypothesis prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting, 15-24 April, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. The component may be an array or single sample from one of three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to perform multi-hypothesis prediction (MHP). In particular, video encoder 200 and video decoder 300 may be configured to perform any or all of the following techniques related to MHP, in any combination.

In one example, video encoder 200 and video decoder 300 may apply MHP for non-merge mode only when bi-prediction with CU-level weighting (BCW) uses non-equal weights (i.e., weights for predictors from different references are different). Therefore, video encoder 200 and video decoder 300 may apply MHP as an extension of BCW. For example, when applied on top of VVC, video encoder 200 and video decoder 300 would only code the "additional prediction signal" in non-merge mode when BCW uses a weight that is not "4." Note that the weight for the "additional prediction signal" implies non-equal weight as well.

In another example, in addition or in the alternative to the techniques above, for non-merge mode, the MVD resolution of the "additional prediction signal" is the same as the selected MVD resolution in the base mode. Alternatively, video encoder 200 and video decoder 300 may code the MVD resolution of the "additional prediction signal" as in the AMVR for the base mode. Therefore, the MVD resolution of the "additional prediction signal" can be adaptive and differ from that in the base mode. The additional mode refers to the mode (either merge mode or non-merge mode) where the "additional prediction signal" is signaled.

In another example, in addition or in the alternative to the techniques above, video encoder 200 and video decoder 300 may be configured to apply MHP only with a different motion vector or a different reference picture. This may reduce signaling costs for the additional motion vector and may ensure that the final prediction cannot be a duplicate of BCW.

In another example, in addition or in the alternative to the techniques above, video encoder 200 and video decoder 300 may be configured not to apply MHP to blocks having motion vectors coded using non-merge mode when the AMVR mode is half-luma sample, where a different interpolation filter is applied for motion compensation. The predictor may be generated by smooth interpolation filter in the half-luma sample AMVR mode, and thus, applying MHP (which uses weighted averaging) to generate a smooth predictor does not help much in such a mode. Avoiding signaling of the additional prediction signal may reduce some overhead for such a mode.

In another example, in addition or in the alternative to the techniques above, video encoder 200 and video decoder 300 may be configured to determine whether to apply MHP according to a selected interpolation filter (e.g., a selected interpolation filter index) for interpolating sub-integer pixel values for sub-integer precision motion vectors. In some designs, a set of interpolation filters with different characteristics can be used. The selection of interpolation filter can be per block, signaled, or inherited as a filter index. The interpolation filters may be different for different fractional (sub-integer) positions (phases). MHP may be disabled for some filter combinations. In one example, the set of interpolation filters may include a sharp filter and a smooth filter. Then, video encoder 200 and video decoder 300 may disable MHP for a block if the smooth filter is selected. Generally, "sharp" filter means assigning more weights to some samples than to others, and "smooth" filter means assigning relatively similar weights across different samples.

In another example, in addition or in the alternative to the techniques above, video encoder 200 and video decoder 300 do not select an AMVP candidate list for the motion vector for the additional prediction signal based on whether a POC of a reference picture list is equal to a POC of a used list1 reference picture. Instead, video encoder 200 and video decoder 300 may be configured to determine the list to use according to the reference index. This may simplify the process and provide coding improvements.

In another example, in addition or in the alternative to the techniques above, video encoder 200 and video decoder 300 may be configured with additional weighting factors available for MHP beyond those of Table 1. For example, video encoder 200 and video decoder 300 may be configured to use the weighting factors of Table 2:

TABLE 2

| add_hyp_weight_idx | α |
|---|---|
| 0 | 1/4 |
| 1 | −1/8 |
| 2 | 1/2 |

In the example above, the additional weight of ½ can be used. This allows video encoder 200 to assign more importance to the additional hypothesis than was possible with the conventional method.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
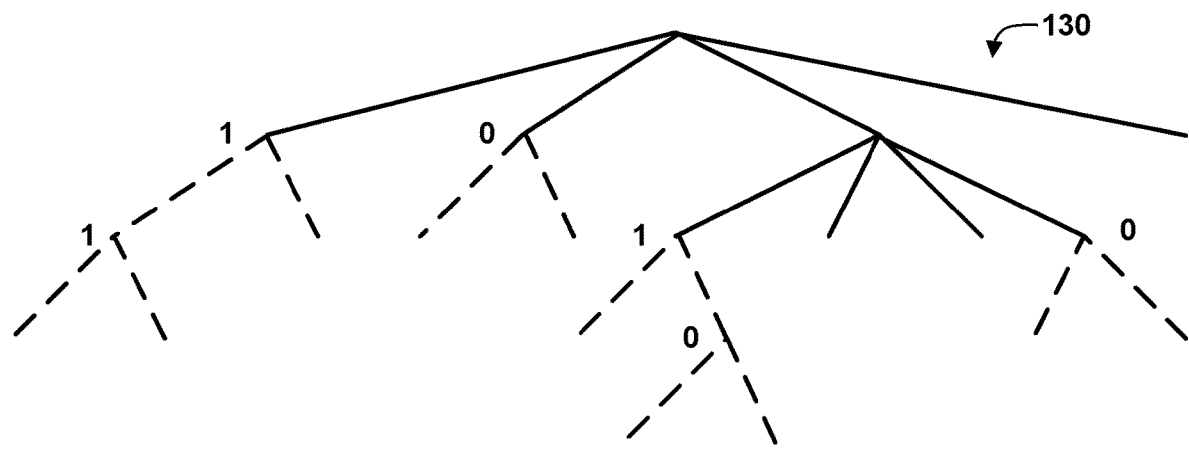
FIGS. 2A and 2B are conceptual diagrams illustrating an example quadtree binary tree (QTBT) structure, and a corresponding coding tree unit (CTU).
Figure 2B:
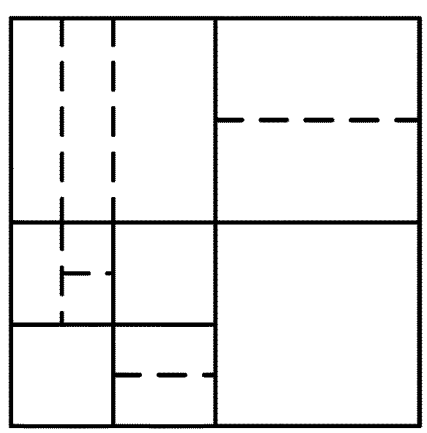

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) it implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
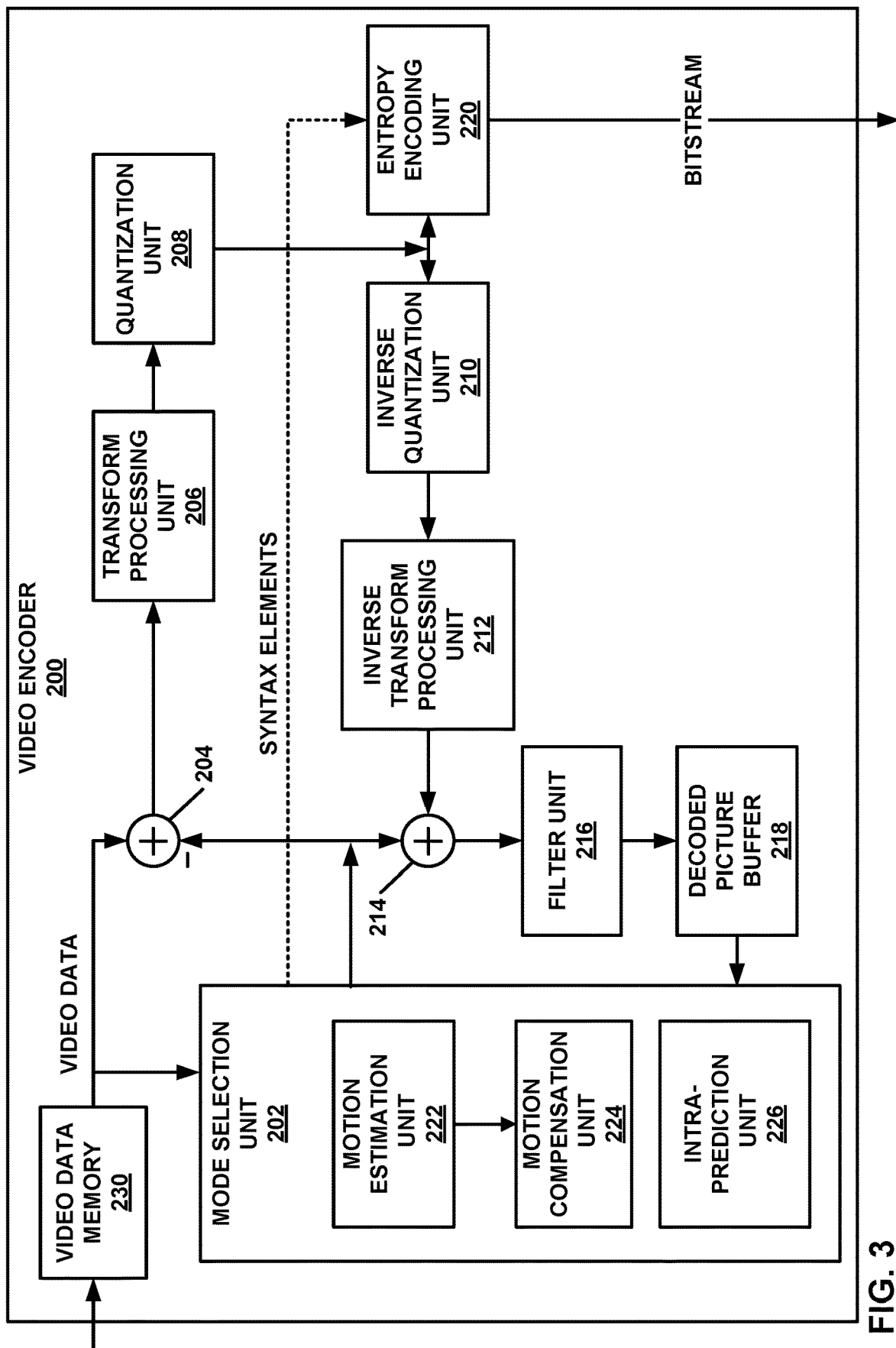
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the ITU-T H.265/HEVC video coding standard and the VVC video coding standard in development. However, the techniques of this disclosure are not limited to these video coding standards and are applicable generally to other video encoding and decoding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations. According to the techniques of this disclosure, mode selection unit 202 may select whether to predict the current block using multi-hypotheses prediction (MHP) according to the techniques of this disclosure, as well as any of the other various factors discussed above, e.g., weights to apply to the predicted blocks, MVD resolutions, and the like.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MV s) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. For MHP, motion estimation unit 222 may provide additional motion vectors.

Motion compensation unit 224 may then generate a prediction block using the motion vectors and various weights, and mode selection unit 202 may ultimately determine an appropriate one of the weights. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction and/or MHP, motion compensation unit 224 may retrieve data for two reference blocks identified by respective motion vectors and combine the retrieved data, e.g., through sample-by-sample averaging or weighted averaging.

In some examples, mode selection unit 202 may determine to apply MHP as an extension of bi-prediction with CU-level weighting (BCW). For example, mode selection unit 202 may determine that coding a block using MHP as an extension of BCW yields the best rate-distortion optimization (RDO) value. In particular, motion estimation unit 222 may determine motion information for generating an intermediate prediction block in a base bi-prediction mode, as well as motion information for generating an additional prediction block using an additional prediction mode (e.g., bi-prediction or uni-prediction). Mode selection unit 202 may determine that prediction blocks generated using BCW are to be combined using non-equal weights (e.g., weight values other than 4).

Motion compensation unit 224 may generate two inter-prediction blocks (for the BCW-predicted intermediate prediction block) and combine the two inter-prediction blocks with the non-equal weights to form an intermediate prediction block. Motion compensation unit 224 may then generate an additional prediction block using the additional prediction mode. Motion compensation unit 224 may further combine the intermediate prediction block with the additional prediction block according to MHP. Furthermore, mode selection unit 202 may determine to encode the motion information using a non-merge mode, such as AMVP.

Mode selection unit 202 may also determine a weighting factor for combining the intermediate prediction block with the additional prediction block according to MHP. The weighting factor for MHP is distinct from the non-equal weights of BCW. For example, mode selection unit 202 may provide the value of the weighting factor to entropy encoding unit 220 to be coded according to a table specifying an additional hypothesis weight index value (e.g., add_hyp_weight_idx) for the weighting factor. Entropy encoding unit 220 may determine the value of the additional hypothesis weight index value from the table. Thus, entropy encoding unit 220 may encode both data representing the BCW non-equal weights as well as the weighting factor for MHP.

Mode selection unit 202 may provide the values of the weights, as well as motion information for the base bi-prediction mode and the additional prediction mode, to entropy encoding unit 220. In some examples, motion estimation unit 222 and motion compensation unit 224 may be configured to use an MVD precision for the MVD of the motion information for the additional prediction signal that is the same as the MVD precision for the MVD of the base bi-prediction mode. Thus, mode selection unit 202 need not provide data representative of the MVD precision for the additional prediction mode to entropy encoding unit 220.

In other examples, if mode selection unit 202 determines to predict a current block using bi-prediction mode with equal weights, mode selection unit 202 may prevent the use of an additional prediction signal for MHP. Thus, entropy encoding unit 220 need not code any additional motion information when the weights are equal for BCW.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 4:
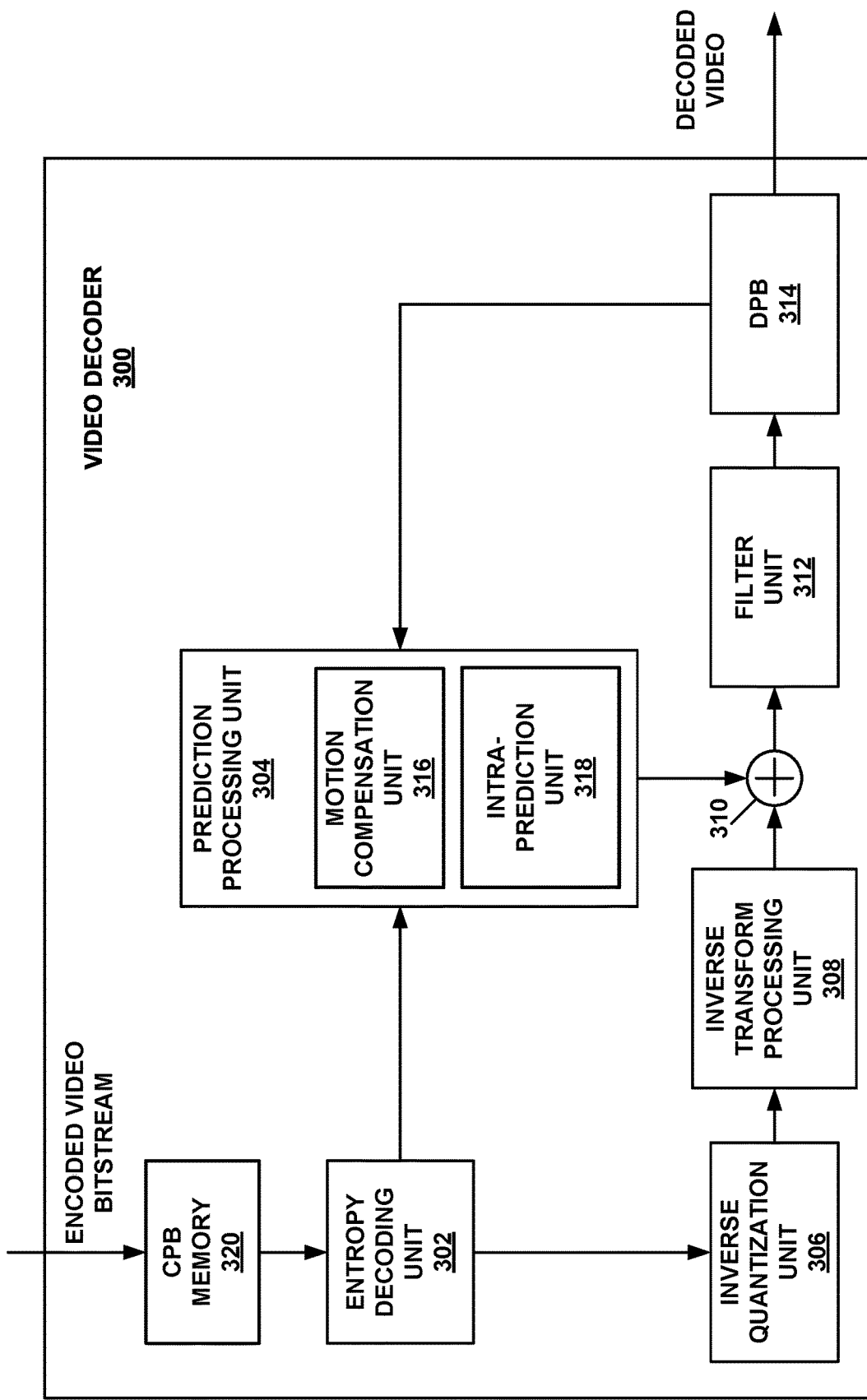
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

For example, motion compensation unit 316 may be configured to perform uni-directional prediction or bi-directional prediction, or MHP according to the techniques of this disclosure. Prediction processing unit 304 may be configured according to the techniques of this disclosure to determine whether MHP is available for a current block, and to control motion compensation unit 316 to perform or not perform MHP accordingly. Entropy decoding unit 302 may, in some examples, decode data representing MVD weights for motion vectors and/or weights to be applied to prediction blocks to form weighted combinations of the prediction blocks.

In some examples, entropy decoding unit 302 may decode data representing weights for BCW mode for a current block. When the weights for BCW mode are non-equal, entropy decoding unit 302 may further determine that additional motion information for an additional prediction signal is to be entropy decoded. Thus, entropy decoding unit 302 may entropy decode the additional motion information, as well as the motion information for a base bi-prediction mode for BCW, and provide the weights and all of the motion information to prediction processing unit 304. Entropy decoding unit 302 may further entropy decode a weighting factor index value for MHP, representing a weighting factor to be used when combining prediction blocks according to MHP. Entropy decoding unit 302 may determine the weighting factor from the weighting factor index using a weighting factor table that maps index values to weighting factors.

Motion compensation unit 316 may generate two inter-prediction blocks (for the BCW-predicted intermediate prediction block) and combine the two inter-prediction blocks with the non-equal weights to form an intermediate prediction block. Motion compensation unit 316 may then generate an additional prediction block using the additional prediction mode. Motion compensation unit 316 may further combine the intermediate prediction block with the additional prediction block according to MHP using the weighting factor. Again, the weighting factor for MHP is distinct from the weights of BCW.

In some examples, motion compensation unit 316 may be configured to use an MVD precision for the MVD of the motion information for the additional prediction signal that is the same as the MVD precision for the MVD of the base bi-prediction mode. Thus, entropy decoding unit 302 may not decode data representative of the MVD precision for the additional prediction mode.

In other examples, if entropy decoding unit 302 decodes data indicating that a current block is to be predicted using bi-prediction mode with equal weights, entropy decoding unit 302 may determine that no additional motion information is to be decoded for the current block. Thus, subsequent data of the bitstream may correspond to a different syntax element than additional motion information.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Figure 5:
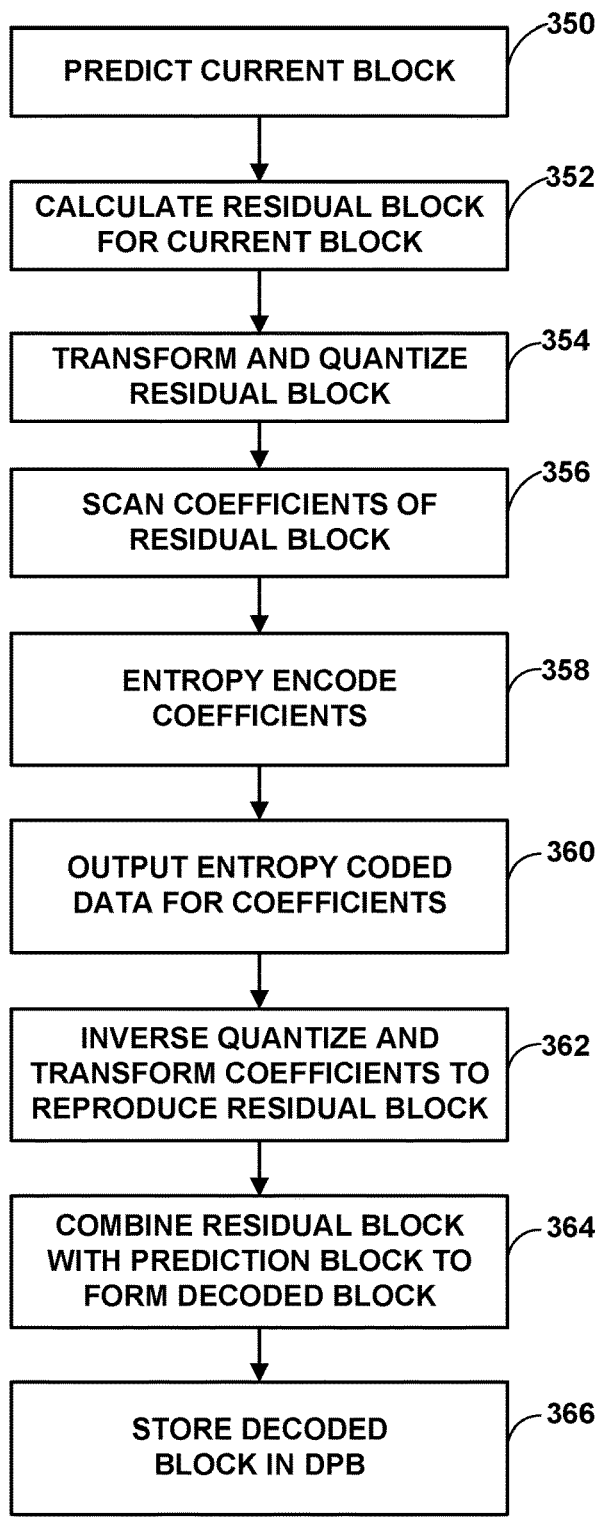
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may form the prediction block according to MHP as discussed above, in accordance with the techniques of this disclosure. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

In this manner, the method of FIG. 5 represents an example of a method of decoding (and/or encoding) a current block, including determining that a first weight and a second weight are specified for a current block of video data that is inter-prediction coded using bi-prediction mode, wherein the first weight is different than the second weight; in response to determining that the first weight and the second weight are specified, determining whether the current block is to be predicted using multi-hypothesis prediction (MHP) mode with the bi-prediction mode as a base mode; in response to determining that the current block is to be predicted using the MHP mode with the bi-prediction mode as the base mode, determining an additional inter-prediction mode of the MHP mode; generating a first prediction block according to the bi-prediction mode; generating a second prediction block according to the additional inter-prediction mode; generating a final prediction block for the current block according to the MHP mode using the first prediction block and the second prediction block; and decoding the current block using the final prediction block.

Figure 6:
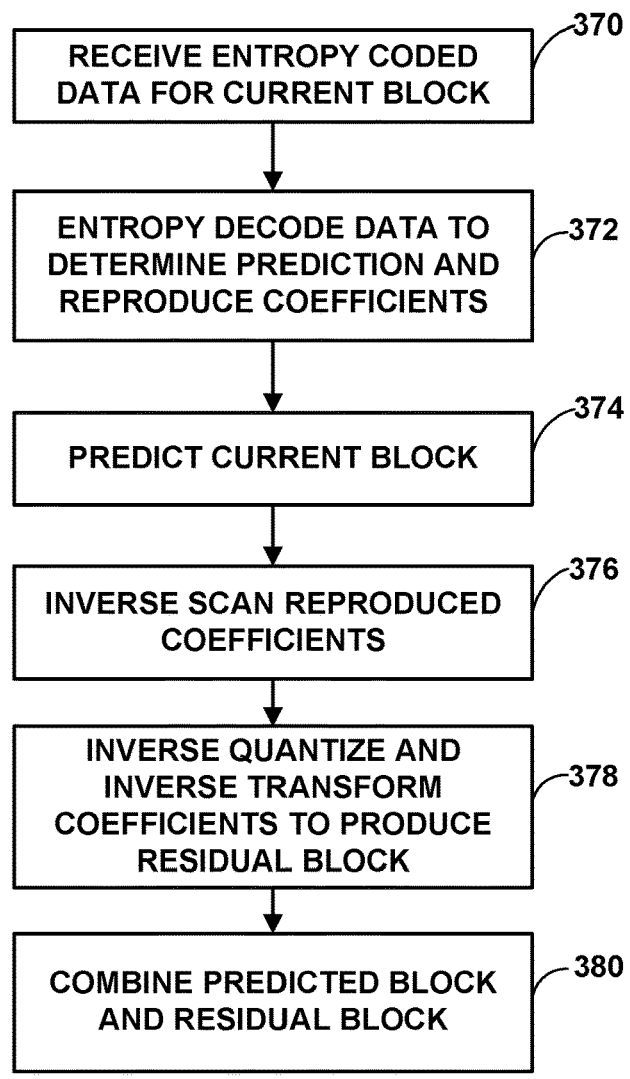
FIG. 6 is a flowchart illustrating an example method for decoding a current block in accordance with the techniques of this disclosure.

FIG. 6 is a flowchart illustrating an example method for decoding a current block in accordance with the techniques of this disclosure. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may form the prediction block according to MHP as discussed above, in accordance with the techniques of this disclosure. Video decoder 300 may then inverse scan the reproduced coefficients (376), to create a block of quantized transform coefficients. Video decoder 300 may then inverse quantize and inverse transform the quantized transform coefficients to produce a residual block (378). Video decoder 300 may ultimately decode the current block by combining the prediction block and the residual block (380).

In this manner, the method of FIG. 6 represents an example of a method of decoding a current block, including determining that a first weight and a second weight are specified for a current block of video data that is inter-prediction coded using bi-prediction mode, wherein the first weight is different than the second weight; in response to determining that the first weight and the second weight are specified, determining whether the current block is to be predicted using multi-hypothesis prediction (MHP) mode with the bi-prediction mode as a base mode; in response to determining that the current block is to be predicted using the MHP mode with the bi-prediction mode as the base mode, determining an additional inter-prediction mode of the MHP mode; generating a first prediction block according to the bi-prediction mode; generating a second prediction block according to the additional inter-prediction mode; generating a final prediction block for the current block according to the MHP mode using the first prediction block and the second prediction block; and decoding the current block using the final prediction block.

Figure 7:
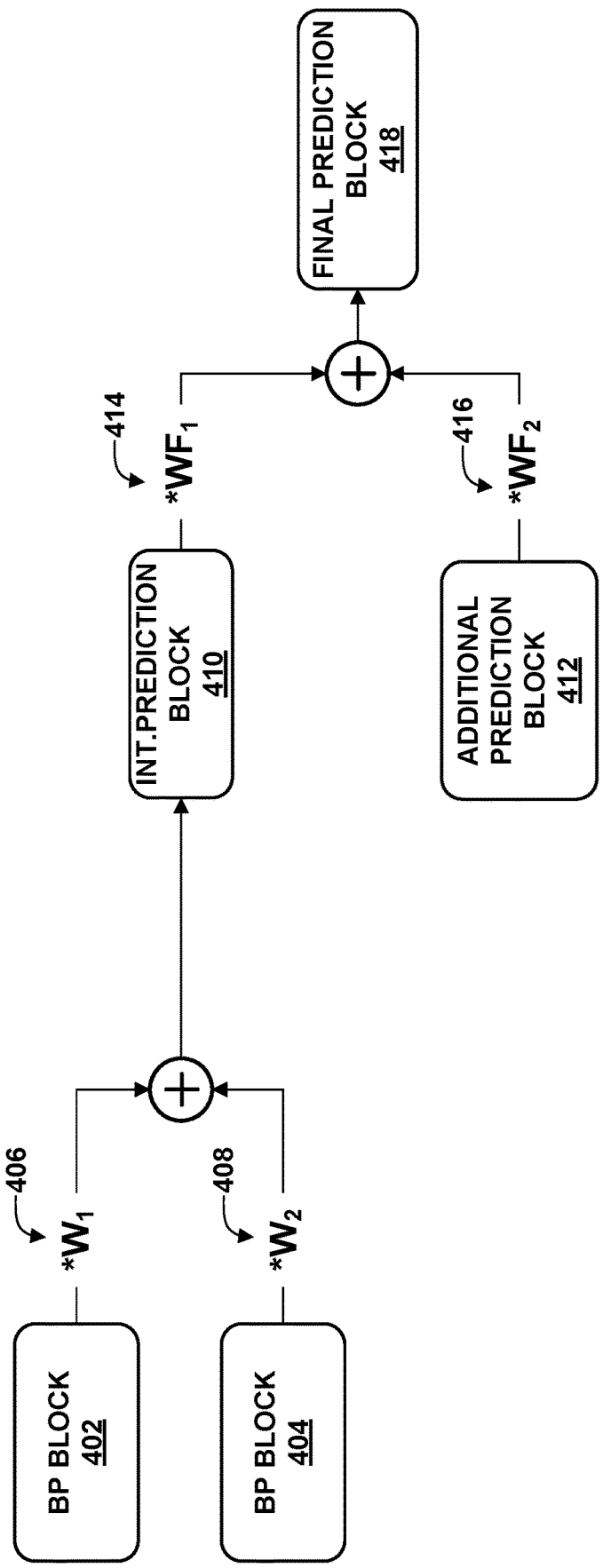
FIG. 7 is a conceptual diagram illustrating an example of applying bi-prediction with CU-level weighting (BCW) and multi-hypothesis prediction (MHP) as an extension of BCW.

FIG. 7 is a conceptual diagram illustrating an example of applying bi-prediction with CU-level weighting (BCW) and multi-hypothesis prediction (MHP) as an extension of BCW.

The example of FIG. 7 is described with respect to video decoder 300 of FIGS. 1 and 4. However, video encoder 200 may be configured to perform these or similar techniques as well.

Initially, video decoder 300 may form a first bi-prediction (BP) block 402 and a second bi-prediction block 404. Video decoder 300 may use a first motion vector to form first bi-prediction block 402 and a second motion vector to form second bi-prediction block 404. Video decoder 300 may also decode motion information representing the first and second motion vectors, e.g., according to a mode other than merge mode, such as AMVP. Thus, video decoder 300 may decode, for example, AMVP candidate indexes identifying neighboring blocks to use as motion vector predictors, motion vector difference (MVD) values representing differences between the MVPs and the actual first and second motion vectors, reference picture list identifiers, and reference picture index values identifying reference pictures in the corresponding reference picture lists. The MVD values may have a particular resolution, such as full pixel, half pixel, quarter pixel, eighth pixel, or the like.

Video decoder 300 may further decode data representing weights $W_1$ 406 and $W_2$ 408. Weights $W_1$ 406 and $W_2$ 408 when added together may form a total value of 8. Video decoder 300 may apply weight $W_1$ 406 to samples of first bi-prediction block 402 and weight $W_2$ 408 to samples of second bi-prediction block 404. That is, video decoder 300 may multiply weight $W_1$ 406 by values of each of the samples of first bi-prediction block 402 and weight $W_2$ 408 by values of each of the samples of second bi-prediction block 404. Rather than performing explicit multiplication functions, video decoder 300 may perform bitwise left-shift operations according to the values of the respective weights. Video decoder 300 may then combine the weighted samples of first bi-prediction block 402 with the weighted samples of second bi-prediction block 404 and divide the sum for each of the samples by the total value of the weights, e.g., 8. Rather than performing an explicit division operation, video decoder 300 may perform a bitwise right-shift by 3 bits. The resulting block is referred to in FIG. 7 as intermediate (int.) prediction block 410.

When weights $W_1$ 406 and $W_2$ 408 are non-equal (e.g., both $W_1$ 406 and $W_2$ 408 are not equal to 4), video decoder 300 may determine that multi-hypothesis prediction is to be performed as an extension of BCW. Thus, video decoder 300 may further decode, from the video bitstream, motion information for an additional inter-prediction mode. Video decoder 300 may decode the motion information using, e.g., AMVP mode or another non-merge mode. In some examples, video decoder 300 may determine that an MVD value for the additional inter-prediction mode has the same MVD resolution as the motion information for the bi-prediction motion information used to form first bi-prediction block 402 and second bi-prediction block 404, such that no additional data need be decoded representing the MVD resolution for the additional inter-prediction mode. Video decoder 300 may also use the motion information to generate additional prediction block 412.

Video decoder 300 may also decode data representing weighting factor values $WF_1$ 414 and $WF_2$ 416. For example, video decoder 300 may decode a weighting factor index value, such as a value for the add_hyp_weight_idx syntax element. Video decoder 300 may determine the values of $WF_1$ 414 and $WF_2$ 416 according to the weighting factor index value, e.g., using a weighting factor index table. Video decoder 300 may then apply $WF_1$ 414 to samples of intermediate prediction block 410 and $WF_2$ 416 to samples of additional prediction block 412. Ultimately, video decoder 300 may combine the weighted values of the samples of intermediate prediction block 410 with the weighted values of the samples of additional prediction block 412 to generate final prediction block 418. Video decoder 300 may then use final prediction block 418 to decode (reconstruct) a corresponding block, e.g., including adding samples of final prediction block 418 to corresponding samples of a residual block.

Figure 8:
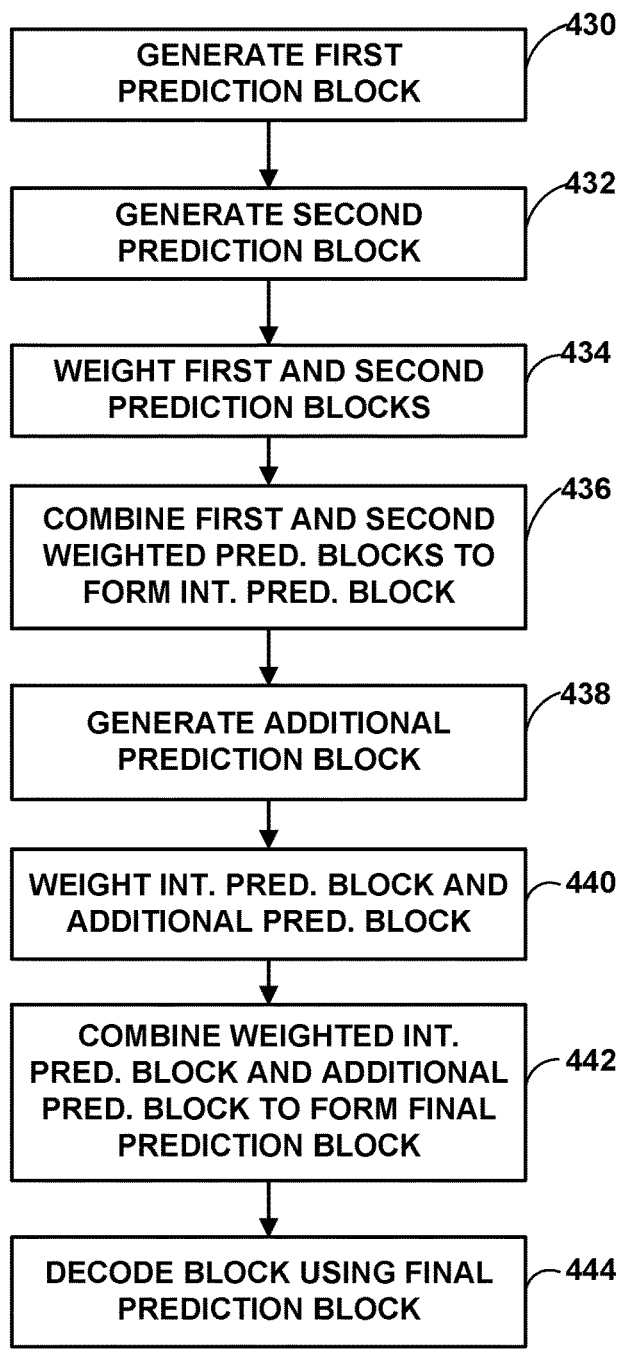
FIG. 8 is a flowchart illustrating an example method of decoding (e.g., reproducing) a current block of video data according to the techniques of this disclosure.

FIG. 8 is a flowchart illustrating an example method of decoding (e.g., reproducing) a current block of video data according to the techniques of this disclosure. The method of FIG. 8 may be performed by video encoder 200 (during a decoding loop of the encoding process) or by video decoder 300. For example, the method of FIG. 8 may generally correspond to step 350 of FIG. 5 or step 374 of FIG. 6. For purposes of example and explanation, the method of FIG. 8 is explained with respect to video decoder 300.

Initially, video decoder 300 may generate a first prediction block (430) and a second prediction block (432). For example, video decoder 300 may receive motion information encoded in AMVP mode, including respective motion vector difference (MVD) values, AMVP candidate identifiers, reference list identifiers, and reference list indexes, as well as weights to be applied to form a bi-prediction with CU-level weighting (BCW) block.

In this example, video decoder 300 may determine that the weights are non-equal values, e.g., that both weights are not equal to 4. Thus, video decoder 300 may determine that multi-hypothesis prediction (MHP) is to be applied as an extension of BCW. Video decoder 300 may proceed to apply the weights to the first and second prediction blocks (434). Video decoder 300 may also combine the first and second weighted prediction blocks to form an intermediate prediction block (436) for MHP.

In response to determining that the weights are non-equal, video decoder 300 may decode additional motion information, e.g., an AMVP candidate index, an MVD, a reference list identifier, and a reference list index, for an additional prediction mode (or multiple of such values, if the additional prediction mode is bi-prediction). Video decoder 300 may then generate an additional prediction block using the additional motion information (438). Video decoder 300 may further determine weights for the intermediate prediction block and the additional prediction block. Such weights may be pre-determined or signaled, e.g., using an index into a weighting factor table. Video decoder 300 may then apply the weights to the intermediate prediction block and the additional prediction block (440) and combine the weighted intermediate prediction block and the weighted additional prediction block to form a final prediction block (442).

Ultimately, video decoder 300 may decode the current block using the final prediction block (444). For example, video decoder 300 may combine samples of the final prediction block with corresponding samples of a reconstructed residual block, e.g., as discussed with respect to steps 376-380 of FIG. 6. When the method of FIG. 8 is performed by video encoder 200, video encoder 200 may subtract samples of the final prediction block from corresponding samples of a residual block as discussed with respect to steps 352-358 of FIG. 5 to encode the current block. Additionally, video encoder 200 may add the samples of the final prediction block to the corresponding samples of the current block as discussed with respect to steps 362-366 of FIG. 5 to decode the current block.

In this manner, the method of FIG. 8 represents an example of a method of decoding (and/or encoding) a current block, including determining that a first weight and a second weight are specified for a current block of video data that is inter-prediction coded using bi-prediction mode, wherein the first weight is different than the second weight; in response to determining that the first weight and the second weight are specified, determining whether the current block is to be predicted using multi-hypothesis prediction (MHP) mode with the bi-prediction mode as a base mode; in response to determining that the current block is to be predicted using the MHP mode with the bi-prediction mode as the base mode, determining an additional inter-prediction mode of the MHP mode; generating a first prediction block according to the bi-prediction mode; generating a second prediction block according to the additional inter-prediction mode; generating a final prediction block for the current block according to the MHP mode using the first prediction block and the second prediction block; and decoding the current block using the final prediction block.

Various techniques of this disclosure are summarized in the following clauses:

Clause 1: A method of decoding video data, the method comprising: determining that a current block of data is inter-prediction coded using at least two motion vectors for which weights are specified and where the at least two motion vectors are coded using a mode other than merge mode; in response to determining that the weights are specified, determining whether the current block is to be predicted using multi-hypothesis prediction (MHP); in response to determining that the current block is to be predicted using MHP, forming a prediction block for the current block according to MHP using the at least two motion vectors; and decoding the current block using the prediction block.

Clause 2: The method of clause 1, wherein determining whether the current block is to be predicted using MHP comprises determining that the current block is to be predicted using MHP when the weights include a weight value of 4.

Clause 3: A method of decoding video data, the method comprising: determining that a current block of data is inter-prediction coded using two or more motion vectors where the two or more motion vectors are coded using a mode other than merge mode, the two or more motion vectors including a base motion vector and an additional motion vector; determining that a precision for a motion vector difference (MVD) value for the additional motion vector is equal to a precision for an MVD value for the base motion vector; forming a prediction block for the current block according to multi-hypothesis prediction (MHP) using the two or more motion vectors; and decoding the current block using the prediction block.

Clause 4: A method comprising the method of any of clauses 1 and 2 and the method of clause 3.

Clause 5: The method of any of clauses 3 and 4, further comprising: decoding data representing the precision for the MVD value for the base motion vector; and inferring the precision for the MVD value for the additional motion vector from the precision for the MVD value for the base motion vector, without decoding additional data representing the precision for the MVD value for the additional motion vector.

Clause 6: A method of decoding video data, the method comprising: determining that a current block of data is inter-prediction coded using two or more motion vectors, the two or more motion vectors including a base motion vector and an additional motion vector; decoding data representing a first precision for a motion vector difference (MVD) value for the additional motion vector; decoding data representing a second precision for an MVD value for the base motion vector; forming a prediction block for the current block according to multi-hypothesis prediction (MHP) using the two or more motion vectors; and decoding the current block using the prediction block.

Clause 7: A method comprising the method of any of clauses 1 and 2 and the method of clause 6.

Clause 8: A method of decoding video data, the method comprising: determining that a current block of data is inter-prediction coded using two or more sets of motion information according to multi-hypothesis prediction (MHP), the first set of motion information including a first motion vector and first reference picture identifying data representing a first reference picture to which the first motion vector points; in response to determining that the current block is inter-prediction coded using the two or more sets of motion information according to MHP, determining that the second set of motion information includes at least one of a second motion vector different than the first motion vector or second reference picture identifying data representing a second reference picture different than the first reference picture; forming a prediction block for the current block according to multi-hypothesis prediction (MHP) using the two or more sets of motion information; and decoding the current block using the prediction block.

Clause 9: A method comprising the method of any of clauses 1-7 and the method of clause 8.

Clause 10: A method of decoding video data, the method comprising: determining that a current block of data is inter-prediction coded using at least one motion vector; determining that an advanced motion vector resolution (AMVR) for the at least one motion vector is half-luma sample resolution; in response to determining that the AMVR for the at least one motion vector is the half-luma sample resolution, determining that the current block is not predicted using multi-hypothesis prediction (MHP); forming a prediction block for the current block using the at least one motion vector, without using MHP; and decoding the current block using the prediction block.

Clause 11: A method comprising the method of any of clauses 1-9 and the method of clause 10.

Clause 12: A method of decoding video data, the method comprising: determining that a current block of data is inter-prediction coded using at least one motion vector having sub-pixel precision; decoding data representing an interpolation filter to be used to interpolate values for sub-pixels of a reference picture; determining whether the current block is to be predicted using multi-hypothesis prediction (MHP) according to the data representing the interpolation filter; forming a prediction block for the current block using the at least one motion vector; and decoding the current block using the prediction block.

Clause 13: A method comprising the method of any of clauses 1-11 and the method of clause 12.

Clause 14: The method of any of clauses 12 and 13, wherein determining whether the current block is to be predicted using MHP comprises: determining whether the interpolation filter assigns more weights to a first sample of the reference picture than to a second sample of the reference picture; and when the interpolation filter assigns more weights to the first sample of the reference picture than to the second sample of the reference picture, determining that the current block is to be predicted using MHP.

Clause 15: A method of decoding video data, the method comprising: determining that a current block of data is inter-prediction coded using two or more sets of motion information according to multi-hypothesis prediction (MHP), the first set of motion information including a first reference index and the second set of motion information including a second reference index; determining a first motion vector prediction candidate list according to the first reference index; decoding a first motion vector of the first set of motion information using the first motion vector prediction candidate list; determining a second motion vector prediction candidate list according to the second reference index; decoding a second motion vector of the second set of motion information using the second motion vector prediction candidate list; forming a prediction block for the current block according to multi-hypothesis prediction (MHP) using the first motion vector and the second motion vector; and decoding the current block using the prediction block.

Clause 16: A method comprising the method of any of clauses 1-14 and the method of clause 15.

Clause 17: A method of decoding video data, the method comprising: determining that a current block of data is inter-prediction coded using two or more motion vectors according to multi-hypothesis prediction (MHP); forming a prediction block for the current block according to multi-hypothesis prediction (MHP) using the two or more motion vectors, comprising: forming a first intermediate prediction block using a first motion vector of the two or more motion vectors; forming a second intermediate prediction block using a second motion vector of the two or more motion vectors; determining a weight to apply to the second intermediate prediction block, the weight comprising one of ¼, −⅛, or ½; and combining the first intermediate prediction block and the second intermediate prediction block using the weight to form the prediction block; and decoding the current block using the prediction block.

Clause 18: A method comprising the method of any of clauses 1-16 and the method of clause 17.

Clause 19: The method of any of clauses 17 and 18, wherein determining the weight to apply to the second intermediate prediction block comprises: decoding a value for an add_hyp_weight_idx syntax element; when the value for the add_hyp_weight_idx syntax element is 0, determining that the weight comprises ¼; when the value for the add_hyp_weight_idx syntax element is 1, determining that the weight comprises −⅛; and when the value for the add_hyp_weight_idx syntax element is 2, determining that the weight comprises ½.

Clause 20: The method of any of clauses 1-19, further comprising encoding the current block prior to decoding the current block.

Clause 21: A device for decoding video data, the device comprising one or more means for performing the method of any of clauses 1-20.

Clause 22: The device of clause 21, wherein the one or more means comprise one or more processors implemented in circuitry.

Clause 23: The device of clause 21, further comprising a display configured to display the decoded video data.

Clause 24: The device of clause 21, wherein the device comprises one or more of a camera, a computer, a mobile device, a broadcast receiver device, or a set-top box.

Clause 25: The device of clause 21, further comprising a memory configured to store the video data.

Clause 26: A computer-readable storage medium having stored thereon instructions that, when executed, cause a processor of a device for decoding video data to perform the method of any of clauses 1-20.

Clause 27: A device for decoding video data, the device comprising: means for determining that a current block of data is inter-prediction coded using at least two motion vectors for which weights are specified and where the at least two motion vectors are coded using a mode other than merge mode; means for determining, in response to determining that the weights are specified, whether the current block is to be predicted using multi-hypothesis prediction (MHP); means for forming, in response to determining that the current block is to be predicted using MHP, a prediction block for the current block according to MHP using the at least two motion vectors; and means for decoding the current block using the prediction block.

Clause 28: A device for decoding video data, the device comprising: means for determining that a current block of data is inter-prediction coded using two or more motion vectors where the two or more motion vectors are coded using a mode other than merge mode, the two or more motion vectors including a base motion vector and an additional motion vector; means for determining that a precision for a motion vector difference (MVD) value for the additional motion vector is equal to a precision for an MVD value for the base motion vector; means for forming a prediction block for the current block according to multi-hypothesis prediction (MHP) using the two or more motion vectors; and means for decoding the current block using the prediction block.

Clause 29: A device for decoding video data, the device comprising: means for determining that a current block of data is inter-prediction coded using two or more motion vectors, the two or more motion vectors including a base motion vector and an additional motion vector; means for decoding data representing a first precision for a motion vector difference (MVD) value for the additional motion vector; means for decoding data representing a second precision for an MVD value for the base motion vector; means for forming a prediction block for the current block according to multi-hypothesis prediction (MHP) using the two or more motion vectors; and means for decoding the current block using the prediction block.

Clause 30: A device for decoding video data, the device comprising: means for determining that a current block of data is inter-prediction coded using two or more sets of motion information according to multi-hypothesis prediction (MHP), the first set of motion information including a first motion vector and first reference picture identifying data representing a first reference picture to which the first motion vector points; means for determining, in response to determining that the current block is inter-prediction coded using the two or more sets of motion information according to MHP, that the second set of motion information includes at least one of a second motion vector different than the first motion vector or second reference picture identifying data representing a second reference picture different than the first reference picture; means for forming a prediction block for the current block according to multi-hypothesis prediction (MHP) using the two or more sets of motion information; and means for decoding the current block using the prediction block.

Clause 31: A device for decoding video data, the device comprising: means for determining that a current block of data is inter-prediction coded using at least one motion vector; means for determining that an advanced motion vector resolution (AMVR) for the at least one motion vector is half-luma sample resolution; means for determining, in response to determining that the AMVR for the at least one motion vector is the half-luma sample resolution, that the current block is not predicted using multi-hypothesis prediction (MHP); means for forming a prediction block for the current block using the at least one motion vector, without using MHP; and means for decoding the current block using the prediction block.

Clause 32: A device for decoding video data, the device comprising: means for determining that a current block of data is inter-prediction coded using at least one motion vector having sub-pixel precision; means for decoding data representing an interpolation filter to be used to interpolate values for sub-pixels of a reference picture; means for determining whether the current block is to be predicted using multi-hypothesis prediction (MHP) according to the data representing the interpolation filter; means for forming a prediction block for the current block using the at least one motion vector; and means for decoding the current block using the prediction block.

Clause 33: A device for decoding video data, the device comprising: means for determining that a current block of data is inter-prediction coded using two or more sets of motion information according to multi-hypothesis prediction (MHP), the first set of motion information including a first reference index and the second set of motion information including a second reference index; means for determining a first motion vector prediction candidate list according to the first reference index; means for decoding a first motion vector of the first set of motion information using the first motion vector prediction candidate list; means for determining a second motion vector prediction candidate list according to the second reference index; means for decoding a second motion vector of the second set of motion information using the second motion vector prediction candidate list; means for forming a prediction block for the current block according to multi-hypothesis prediction (MHP) using the first motion vector and the second motion vector; and means for decoding the current block using the prediction block.

Clause 34: A device for decoding video data, the device comprising: means for determining that a current block of data is inter-prediction coded using two or more motion vectors according to multi-hypothesis prediction (MHP); means for forming a prediction block for the current block according to multi-hypothesis prediction (MHP) using the two or more motion vectors, comprising: means for forming a first intermediate prediction block using a first motion vector of the two or more motion vectors; means for forming a second intermediate prediction block using a second motion vector of the two or more motion vectors; means for determining a weight to apply to the second intermediate prediction block, the weight comprising one of ¼, −⅛, or ½; and means for combining the first intermediate prediction block and the second intermediate prediction block using the weight to form the prediction block; and means for decoding the current block using the prediction block.

Clause 35: A method of decoding video data, the method comprising: determining that a first weight and a second weight are specified for a current block of video data that is inter-prediction coded using bi-prediction mode, wherein the first weight is different than the second weight; in response to determining that the first weight and the second weight are specified, determining whether the current block is to be predicted using multi-hypothesis prediction (MHP) mode with the bi-prediction mode as a base mode; in response to determining that the current block is to be predicted using the MHP mode with the bi-prediction mode as the base mode, determining an additional inter-prediction mode of the MHP mode; generating a first prediction block according to the bi-prediction mode; generating a second prediction block according to the additional inter-prediction mode; generating a final prediction block for the current block according to the MHP mode using the first prediction block and the second prediction block; and decoding the current block using the final prediction block.

Clause 36: The method of clause 35, wherein determining whether the current block is to be predicted using MHP comprises determining that the current block is to be predicted using MHP when the first weight is not equal to 4 and the second weight is not equal to 4.

Clause 37: The method of clause 35, wherein determining whether the current block is to be predicted using MHP comprises determining that the current block is to be predicted using MHP when the first weight is not equal to the second weight.

Clause 38: The method of clause 35, further comprising: decoding a first motion vector using advanced motion vector prediction (AMVP) mode for the bi-prediction mode; decoding a second motion vector using the AMVP mode for the bi-prediction mode; and decoding a third motion vector for the additional inter-prediction mode, wherein generating the first prediction block comprises: generating a first intermediate prediction block using the first motion vector, generating a second intermediate prediction block using the second motion vector, applying the first weight to the first intermediate prediction block to form a first weighted intermediate prediction block, applying the second weight to the second intermediate prediction block to form a second weighted intermediate prediction block, and combining the first weighted intermediate prediction block with the second weighted intermediate prediction block to form the first prediction block, and wherein generating the second prediction block comprises generating the second prediction block using the third motion vector.

Clause 39: The method of clause 38, further comprising: decoding data representing a motion vector difference (MVD) resolution for the first motion vector and the second motion vector; and determining that the third motion vector has the MVD resolution without decoding additional data representative of the MVD resolution for the third motion vector.

Clause 40: The method of clause 35, wherein generating the final prediction block comprises: determining a third weight and a fourth weight for the MHP mode; applying the third weight to the first prediction block to form a first weighted prediction block; applying the fourth weight to the second prediction block to form a second weighted prediction block; and combining the first weighted prediction block with the second weighted prediction block to form the final prediction block.

Clause 41: The method of clause 40, wherein determining the third weight comprises: decoding an index value; and determining the third weight to which the index value is mapped in a mapping table, and wherein determining the fourth weight comprises calculating the fourth weight as one minus the third weight.

Clause 42: The method of clause 35, further comprising encoding the current block using the final prediction block prior to decoding the current block.

Clause 43: A device for decoding video data, the device comprising: a memory configured to store video data; and one or more processors implemented in circuitry and configured to: determine that a first weight and a second weight are specified for a current block of video data that is inter-prediction coded using bi-prediction mode, wherein the first weight is different than the second weight; in response to determining that the first weight and the second weight are specified, determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block.

Clause 44: The device of clause 43, wherein to determine whether the current block is to be predicted using MHP, the one or more processors are configured to determine that the current block is to be predicted using MHP when the first weight is not equal to 4 and the second weight is not equal to 4.

Clause 45: The device of clause 43, wherein to determine whether the current block is to be predicted using MHP, the one or more processors are configured to determine that the current block is to be predicted using MHP when the first weight is not equal to the second weight.

Clause 46: The device of clause 43, wherein the one or more processors are further configured to: decode a first motion vector using advanced motion vector prediction (AMVP) mode for the bi-prediction mode; decode a second motion vector using the AMVP mode for the bi-prediction mode; and decode a third motion vector for the additional inter-prediction mode, wherein to generate the first prediction block, the one or more processors are configured to: generate a first intermediate prediction block using the first motion vector, generate a second intermediate prediction block using the second motion vector, apply the first weight to the first intermediate prediction block to form a first weighted intermediate prediction block, apply the second weight to the second intermediate prediction block to form a second weighted intermediate prediction block, and combine the first weighted intermediate prediction block with the second weighted intermediate prediction block to form the first prediction block, and wherein to generate the second prediction block, the one or more processors are configured to generate the second prediction block using the third motion vector.

Clause 47: The device of clause 46, wherein the one or more processors are further configured to: decode data representing a motion vector difference (MVD) resolution for the first motion vector and the second motion vector; and determine that the third motion vector has the MVD resolution without decoding additional data representative of the MVD resolution for the third motion vector.

Clause 48: The device of clause 43, wherein to generate the final prediction block, the one or more processors are configured to: determine a third weight and a fourth weight for the MHP mode; apply the third weight to the first prediction block to form a first weighted prediction block; apply the fourth weight to the second prediction block to form a second weighted prediction block; and combine the first weighted prediction block with the second weighted prediction block to form the final prediction block.

Clause 49: The device of clause 48, wherein to determine the third weight, the one or more processors are configured to: decode an index value; and determine the third weight to which the index value is mapped in a mapping table, and wherein to determine the fourth weight, the one or more processors are configured to calculate the fourth weight as one minus the third weight.

Clause 50: The device of clause 43, wherein the one or more processors are configured to encode the current block using the final prediction block prior to decoding the current block.

Clause 51: The device of clause 43, further comprising a display configured to display the decoded video data.

Clause 52: The device of clause 43, wherein the device comprises one or more of a camera, a computer, a mobile device, a broadcast receiver device, or a set-top box.

Clause 53: A computer-readable storage medium having stored thereon instructions that, when executed, cause a processor to: determine that a first weight and a second weight are specified for a current block of video data that is inter-prediction coded using bi-prediction mode, wherein the first weight is different than the second weight; in response to determining that the first weight and the second weight are specified, determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block.

Clause 54: The computer-readable storage medium of clause 53, wherein the instructions that cause the processor to determine whether the current block is to be predicted using MHP comprises instructions that cause the processor to determine that the current block is to be predicted using MHP when the first weight is not equal to 4 and the second weight is not equal to 4.

Clause 55: The computer-readable storage medium of clause 53, wherein the instructions that cause the processor to determine whether the current block is to be predicted using MHP comprise instructions that cause the processor to determine that the current block is to be predicted using MHP when the first weight is not equal to the second weight.

Clause 56: The computer-readable storage medium of clause 53, further comprising instructions that cause the processor to: decode a first motion vector using advanced motion vector prediction (AMVP) mode for the bi-prediction mode; decode a second motion vector using the AMVP mode for the bi-prediction mode; and decode a third motion vector for the additional inter-prediction mode, wherein the instructions that cause the processor to generate the first prediction block comprise instructions that cause the processor to: generate a first intermediate prediction block using the first motion vector, generate a second intermediate prediction block using the second motion vector, apply the first weight to the first intermediate prediction block to form a first weighted intermediate prediction block, apply the second weight to the second intermediate prediction block to form a second weighted intermediate prediction block, and combine the first weighted intermediate prediction block with the second weighted intermediate prediction block to form the first prediction block, and wherein the instructions that cause the processor to generate the second prediction block comprise instructions that cause the processor to generate the second prediction block using the third motion vector.

Clause 57: The computer-readable storage medium of clause 56, further comprising instructions that cause the processor to: decode data representing a motion vector difference (MVD) resolution for the first motion vector and the second motion vector; and determine that the third motion vector has the MVD resolution without decoding additional data representative of the MVD resolution for the third motion vector.

Clause 58: The computer-readable storage medium of clause 53, wherein the instructions that cause the processor to generate the final prediction block comprise instructions that cause the processor to: determine a third weight and a fourth weight for the MHP mode; apply the third weight to the first prediction block to form a first weighted prediction block; apply the fourth weight to the second prediction block to form a second weighted prediction block; and combine the first weighted prediction block with the second weighted prediction block to form the final prediction block.

Clause 59: The computer-readable storage medium of clause 58, wherein the instructions that cause the processor to determine the third weight comprise instructions that cause the processor to: decode an index value; and determine the third weight to which the index value is mapped in a mapping table, and wherein the instructions that cause the processor to determine the fourth weight comprise instructions that cause the processor to calculate the fourth weight as one minus the third weight.

Clause 60: The computer-readable storage medium of clause 53, further comprising instructions that cause the processor to encode the current block using the final prediction block prior to decoding the current block.

Clause 61: A device for decoding video data, the device comprising: means for determining that a first weight and a second weight are specified for a current block of video data that is inter-prediction coded using bi-prediction mode, wherein the first weight is different than the second weight; means for determining whether the current block is to be predicted using multi-hypothesis prediction (MHP) mode with the bi-prediction mode as a base mode in response to determining that the first weight and the second weight are specified; means for determining an additional inter-prediction mode of the MHP mode in response to determining that the current block is to be predicted using the MHP mode with the bi-prediction mode as the base mode; means for generating a first prediction block according to the bi-prediction mode; means for generating a second prediction block according to the additional inter-prediction mode; means for generating a final prediction block for the current block according to the MHP mode using the first prediction block and the second prediction block; and means for decoding the current block using the final prediction block.

Clause 62: The device of clause 61, wherein the means for determining whether the current block is to be predicted using MHP comprises means for determining that the current block is to be predicted using MHP when the first weight is not equal to 4 and the second weight is not equal to 4.

Clause 63: The device of clause 61, wherein the means for determining whether the current block is to be predicted using MHP comprises means for determining that the current block is to be predicted using MHP when the first weight is not equal to the second weight.

Clause 64: The device of clause 61, further comprising: means for decoding a first motion vector using advanced motion vector prediction (AMVP) mode for the bi-prediction mode; means for decoding a second motion vector using the AMVP mode for the bi-prediction mode; and means for decoding a third motion vector for the additional inter-prediction mode, wherein the means for generating the first prediction block comprises: means for generating a first intermediate prediction block using the first motion vector, means for generating a second intermediate prediction block using the second motion vector, means for applying the first weight to the first intermediate prediction block to form a first weighted intermediate prediction block, means for applying the second weight to the second intermediate prediction block to form a second weighted intermediate prediction block, and means for combining the first weighted intermediate prediction block with the second weighted intermediate prediction block to form the first prediction block, and wherein the means for generating the second prediction block comprises means for generating the second prediction block using the third motion vector.

Clause 65: The device of clause 64, further comprising: means for decoding data representing a motion vector difference (MVD) resolution for the first motion vector and the second motion vector; and means for determining that the third motion vector has the MVD resolution without decoding additional data representative of the MVD resolution for the third motion vector.

Clause 66: The device of clause 61, wherein the means for generating the final prediction block comprises: means for determining a third weight and a fourth weight for the MHP mode; means for applying the third weight to the first prediction block to form a first weighted prediction block; means for applying the fourth weight to the second prediction block to form a second weighted prediction block; and means for combining the first weighted prediction block with the second weighted prediction block to form the final prediction block.

Clause 67: The device of clause 66, wherein the means for determining the third weight comprises: means for decoding an index value; and means for determining the third weight to which the index value is mapped in a mapping table, and wherein the means for determining the fourth weight comprises means for calculating the fourth weight as one minus the third weight.

Clause 68: The device of clause 61, further comprising means for encoding the current block using the final prediction block prior to decoding the current block.

Clause 69: A method of decoding video data, the method comprising: determining that a first weight and a second weight are specified for a current block of video data that is inter-prediction coded using bi-prediction mode, wherein the first weight is different than the second weight; in response to determining that the first weight and the second weight are specified, determining whether the current block is to be predicted using multi-hypothesis prediction (MHP) mode with the bi-prediction mode as a base mode; in response to determining that the current block is to be predicted using the MHP mode with the bi-prediction mode as the base mode, determining an additional inter-prediction mode of the MHP mode; generating a first prediction block according to the bi-prediction mode; generating a second prediction block according to the additional inter-prediction mode; generating a final prediction block for the current block according to the MHP mode using the first prediction block and the second prediction block; and decoding the current block using the final prediction block.

Clause 70: The method of clause 69, wherein determining whether the current block is to be predicted using MHP comprises determining that the current block is to be predicted using MHP when the first weight is not equal to 4 and the second weight is not equal to 4.

Clause 71: The method of clause 69, wherein determining whether the current block is to be predicted using MHP comprises determining that the current block is to be predicted using MHP when the first weight is not equal to the second weight.

Clause 72: The method of any of clauses 69-71, further comprising: decoding a first motion vector using advanced motion vector prediction (AMVP) mode for the bi-prediction mode; decoding a second motion vector using the AMVP mode for the bi-prediction mode; and decoding a third motion vector for the additional inter-prediction mode, wherein generating the first prediction block comprises: generating a first intermediate prediction block using the first motion vector, generating a second intermediate prediction block using the second motion vector, applying the first weight to the first intermediate prediction block to form a first weighted intermediate prediction block, applying the second weight to the second intermediate prediction block to form a second weighted intermediate prediction block, and combining the first weighted intermediate prediction block with the second weighted intermediate prediction block to form the first prediction block, and wherein generating the second prediction block comprises generating the second prediction block using the third motion vector.

Clause 73: The method of clause 72, further comprising: decoding data representing a motion vector difference (MVD) resolution for the first motion vector and the second motion vector; and determining that the third motion vector has the MVD resolution without decoding additional data representative of the MVD resolution for the third motion vector.

Clause 74: The method of any of clauses 69-73, wherein generating the final prediction block comprises: determining a third weight and a fourth weight for the MHP mode; applying the third weight to the first prediction block to form a first weighted prediction block; applying the fourth weight to the second prediction block to form a second weighted prediction block; and combining the first weighted prediction block with the second weighted prediction block to form the final prediction block.

Clause 75: The method of clause 74, wherein determining the third weight comprises: decoding an index value; and determining the third weight to which the index value is mapped in a mapping table, and wherein determining the fourth weight comprises calculating the fourth weight as one minus the third weight.

Clause 76: The method of any of clauses 69-75, further comprising encoding the current block using the final prediction block prior to decoding the current block.

Clause 77: A device for decoding video data, the device comprising: a memory configured to store video data; and one or more processors implemented in circuitry and configured to: determine that a first weight and a second weight are specified for a current block of video data that is inter-prediction coded using bi-prediction mode, wherein the first weight is different than the second weight; in response to determining that the first weight and the second weight are specified, determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block.

Clause 78: The device of clause 77, wherein to determine whether the current block is to be predicted using MHP, the one or more processors are configured to determine that the current block is to be predicted using MHP when the first weight is not equal to 4 and the second weight is not equal to 4.

Clause 79: The device of clause 77, wherein to determine whether the current block is to be predicted using MHP, the one or more processors are configured to determine that the current block is to be predicted using MHP when the first weight is not equal to the second weight.

Clause 80: The device of any of clauses 77-79, wherein the one or more processors are further configured to: decode a first motion vector using advanced motion vector prediction (AMVP) mode for the bi-prediction mode; decode a second motion vector using the AMVP mode for the bi-prediction mode; and decode a third motion vector for the additional inter-prediction mode, wherein to generate the first prediction block, the one or more processors are configured to: generate a first intermediate prediction block using the first motion vector, generate a second intermediate prediction block using the second motion vector, apply the first weight to the first intermediate prediction block to form a first weighted intermediate prediction block, apply the second weight to the second intermediate prediction block to form a second weighted intermediate prediction block, and combine the first weighted intermediate prediction block with the second weighted intermediate prediction block to form the first prediction block, and wherein to generate the second prediction block, the one or more processors are configured to generate the second prediction block using the third motion vector.

Clause 81: The device of clause 80, wherein the one or more processors are further configured to: decode data representing a motion vector difference (MVD) resolution for the first motion vector and the second motion vector; and determine that the third motion vector has the MVD resolution without decoding additional data representative of the MVD resolution for the third motion vector.

Clause 82: The device of any of clauses 77-81, wherein to generate the final prediction block, the one or more processors are configured to: determine a third weight and a fourth weight for the MHP mode; apply the third weight to the first prediction block to form a first weighted prediction block; apply the fourth weight to the second prediction block to form a second weighted prediction block; and combine the first weighted prediction block with the second weighted prediction block to form the final prediction block.

Clause 83: The device of clause 82, wherein to determine the third weight, the one or more processors are configured to: decode an index value; and determine the third weight to which the index value is mapped in a mapping table, and wherein to determine the fourth weight, the one or more processors are configured to calculate the fourth weight as one minus the third weight.

Clause 84: The device of any of clauses 77-83, wherein the one or more processors are configured to encode the current block using the final prediction block prior to decoding the current block.

Clause 85: The device of any of clauses 77-84, further comprising a display configured to display the decoded video data.

Clause 86: The device of any of clauses 77-85, wherein the device comprises one or more of a camera, a computer, a mobile device, a broadcast receiver device, or a set-top box.

Clause 87: A computer-readable storage medium having stored thereon instructions that, when executed, cause a processor to: determine that a first weight and a second weight are specified for a current block of video data that is inter-prediction coded using bi-prediction mode, wherein the first weight is different than the second weight; in response to determining that the first weight and the second weight are specified, determine whether the current block is to be predicted using multi-hypothesis prediction (MHP) mode with the bi-prediction mode as a base mode; in response to determining that the current block is to be predicted using the MHP mode with the bi-prediction mode as the base mode, determine an additional inter-prediction mode of the MHP mode; generate a first prediction block according to the bi-prediction mode; generate a second prediction block according to the additional inter-prediction mode; generate a final prediction block for the current block according to the MHP mode using the first prediction block and the second prediction block; and decode the current block using the final prediction block.

Clause 88: The computer-readable storage medium of clause 87, wherein the instructions that cause the processor to determine whether the current block is to be predicted using MHP comprises instructions that cause the processor to determine that the current block is to be predicted using MHP when the first weight is not equal to 4 and the second weight is not equal to 4.

Clause 89: The computer-readable storage medium of clause 87, wherein the instructions that cause the processor to determine whether the current block is to be predicted using MHP comprise instructions that cause the processor to determine that the current block is to be predicted using MHP when the first weight is not equal to the second weight.

Clause 90: The computer-readable storage medium of any of clauses 87-89, further comprising instructions that cause the processor to: decode a first motion vector using advanced motion vector prediction (AMVP) mode for the bi-prediction mode; decode a second motion vector using the AMVP mode for the bi-prediction mode; and decode a third motion vector for the additional inter-prediction mode, wherein the instructions that cause the processor to generate the first prediction block comprise instructions that cause the processor to: generate a first intermediate prediction block using the first motion vector, generate a second intermediate prediction block using the second motion vector, apply the first weight to the first intermediate prediction block to form a first weighted intermediate prediction block, apply the second weight to the second intermediate prediction block to form a second weighted intermediate prediction block, and combine the first weighted intermediate prediction block with the second weighted intermediate prediction block to form the first prediction block, and wherein the instructions that cause the processor to generate the second prediction block comprise instructions that cause the processor to generate the second prediction block using the third motion vector.

Clause 91: The computer-readable storage medium of clause 90, further comprising instructions that cause the processor to: decode data representing a motion vector difference (MVD) resolution for the first motion vector and the second motion vector; and determine that the third motion vector has the MVD resolution without decoding additional data representative of the MVD resolution for the third motion vector.

Clause 92: The computer-readable storage medium of any of clauses 87-91, wherein the instructions that cause the processor to generate the final prediction block comprise instructions that cause the processor to: determine a third weight and a fourth weight for the MHP mode; apply the third weight to the first prediction block to form a first weighted prediction block; apply the fourth weight to the second prediction block to form a second weighted prediction block; and combine the first weighted prediction block with the second weighted prediction block to form the final prediction block.

Clause 93: The computer-readable storage medium of clause 92, wherein the instructions that cause the processor to determine the third weight comprise instructions that cause the processor to: decode an index value; and determine the third weight to which the index value is mapped in a mapping table, and wherein the instructions that cause the processor to determine the fourth weight comprise instructions that cause the processor to calculate the fourth weight as one minus the third weight.

Clause 94: The computer-readable storage medium of any of clauses 87-93, further comprising instructions that cause the processor to encode the current block using the final prediction block prior to decoding the current block.

Clause 95: A device for decoding video data, the device comprising: means for determining that a first weight and a second weight are specified for a current block of video data that is inter-prediction coded using bi-prediction mode, wherein the first weight is different than the second weight; means for determining whether the current block is to be predicted using multi-hypothesis prediction (MHP) mode with the bi-prediction mode as a base mode in response to determining that the first weight and the second weight are specified; means for determining an additional inter-prediction mode of the MHP mode in response to determining that the current block is to be predicted using the MHP mode with the bi-prediction mode as the base mode; means for generating a first prediction block according to the bi-prediction mode; means for generating a second prediction block according to the additional inter-prediction mode; means for generating a final prediction block for the current block according to the MHP mode using the first prediction block and the second prediction block; and means for decoding the current block using the final prediction block.

Clause 96: The device of clause 95, wherein the means for determining whether the current block is to be predicted using MHP comprises means for determining that the current block is to be predicted using MHP when the first weight is not equal to 4 and the second weight is not equal to 4.

Clause 97: The device of clause 95, wherein the means for determining whether the current block is to be predicted using MHP comprises means for determining that the current block is to be predicted using MHP when the first weight is not equal to the second weight.

Clause 98: The device of any of clauses 95-97, further comprising: means for decoding a first motion vector using advanced motion vector prediction (AMVP) mode for the bi-prediction mode; means for decoding a second motion vector using the AMVP mode for the bi-prediction mode; and means for decoding a third motion vector for the additional inter-prediction mode, wherein the means for generating the first prediction block comprises: means for generating a first intermediate prediction block using the first motion vector, means for generating a second intermediate prediction block using the second motion vector, means for applying the first weight to the first intermediate prediction block to form a first weighted intermediate prediction block, means for applying the second weight to the second intermediate prediction block to form a second weighted intermediate prediction block, and means for combining the first weighted intermediate prediction block with the second weighted intermediate prediction block to form the first prediction block, and wherein the means for generating the second prediction block comprises means for generating the second prediction block using the third motion vector.

Clause 99: The device of clause 98, further comprising: means for decoding data representing a motion vector difference (MVD) resolution for the first motion vector and the second motion vector; and means for determining that the third motion vector has the MVD resolution without decoding additional data representative of the MVD resolution for the third motion vector.

Clause 100: The device of any of clauses 95-99, wherein the means for generating the final prediction block comprises: means for determining a third weight and a fourth weight for the MHP mode; means for applying the third weight to the first prediction block to form a first weighted prediction block; means for applying the fourth weight to the second prediction block to form a second weighted prediction block; and means for combining the first weighted prediction block with the second weighted prediction block to form the final prediction block.

Clause 101: The device of clause 100, wherein the means for determining the third weight comprises: means for decoding an index value; and means for determining the third weight to which the index value is mapped in a mapping table, and wherein the means for determining the fourth weight comprises means for calculating the fourth weight as one minus the third weight.

Clause 102: The device any of clauses 95-101, further comprising means for encoding the current block using the final prediction block prior to decoding the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to eMHPasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a bitstream including video data includes data representing a first weight and a second weight for a current block of the video data that is inter-prediction coded using bi-prediction mode, wherein the data representing the first weight and the second weight indicates that the first weight is different than the second weight, and wherein the first weight and the second weight are to be used for the bi-prediction mode;
   decoding a first motion vector using advanced motion vector prediction (AMVP) mode for the bi-prediction mode;
   decoding a second motion vector using the AMVP mode for the bi-prediction mode;
   in response to determining that the bitstream includes the data representing the first weight and the second weight and that the first weight is different than the second weight, determining whether the current block is to be predicted using multi-hypothesis prediction (MHP) mode with the bi-prediction mode as a base mode;
   in response to determining that the current block is to be predicted using the MHP mode with the bi-prediction mode as the base mode, determining an additional inter-prediction mode of the MHP mode;
   decoding a third motion vector for the additional inter-prediction mode;
   generating a first prediction block according to the bi-prediction mode using the first motion vector, the second motion vector, the first weight, and the second weight;
   generating a second prediction block according to the additional inter-prediction mode using the third motion vector;
   generating a final prediction block for the current block according to the MHP mode using the first prediction block and the second prediction block; and
   decoding the current block using the final prediction block.

2. The method of claim 1, wherein determining whether the current block is to be predicted using MHP comprises determining that the current block is to be predicted using MHP when the first weight is not equal to 4 and the second weight is not equal to 4.

3. The method of claim 1,
   wherein generating the first prediction block comprises:
      generating a first intermediate prediction block using the first motion vector,
      generating a second intermediate prediction block using the second motion vector,
      applying the first weight to the first intermediate prediction block to form a first weighted intermediate prediction block,
      applying the second weight to the second intermediate prediction block to form a second weighted intermediate prediction block, and
      combining the first weighted intermediate prediction block with the second weighted intermediate prediction block to form the first prediction block.

4. The method of claim 1, further comprising:
   decoding data representing a motion vector difference (MVD) resolution for the first motion vector and the second motion vector; and
   determining that the third motion vector has the MVD resolution without decoding additional data representative of the MVD resolution for the third motion vector.

5. The method of claim 1, wherein generating the final prediction block comprises:
   determining a third weight and a fourth weight for the MHP mode;
   applying the third weight to the first prediction block to form a first weighted prediction block;
   applying the fourth weight to the second prediction block to form a second weighted prediction block; and combining the first weighted prediction block with the second weighted prediction block to form the final prediction block.

6. The method of claim 5,
wherein determining the third weight comprises:
decoding an index value; and
determining the third weight to which the index value is mapped in a mapping table, and
wherein determining the fourth weight comprises calculating the fourth weight as one minus the third weight.

7. The method of claim 1, further comprising encoding the current block using the final prediction block prior to decoding the current block.

8. A device for decoding video data, the device comprising:
a memory configured to store video data; and
a processing system comprising one or more processors implemented in circuitry, the processing system being configured to:
determine that a bitstream including video data includes data representing a first weight and a second weight for a current block of the video data that is inter-prediction coded using bi-prediction mode, wherein the data representing the first weight and the second weight indicates that the first weight is different than the second weight, and wherein the first weight and the second weight are to be used for the bi-prediction mode;
decode a first motion vector using advanced motion vector prediction (AMVP) mode for the bi-prediction mode;
decode a second motion vector using the AMVP mode for the bi-prediction mode;
in response to determining that the bitstream includes the data representing the first weight and the second weight and that the first weight is different than the second weight, determine whether the current block is to be predicted using multi-hypothesis prediction (MHP) mode with the bi-prediction mode as a base mode;
in response to determining that the current block is to be predicted using the MHP mode with the bi-prediction mode as the base mode, determine an additional inter-prediction mode of the MHP mode;
decode a third motion vector for the additional inter-prediction mode;
generate a first prediction block according to the bi-prediction mode using the first motion vector, the second motion vector, the first weight, and the second weight;
generate a second prediction block according to the additional inter-prediction mode using the third motion vector;
generate a final prediction block for the current block according to the MHP mode using the first prediction block and the second prediction block; and
decode the current block using the final prediction block.

9. The device of claim 8, wherein to determine whether the current block is to be predicted using MHP, the processing system is configured to determine that the current block is to be predicted using MHP when the first weight is not equal to 4 and the second weight is not equal to 4.

10. The device of claim 8,
wherein to generate the first prediction block, the processing system is configured to:
generate a first intermediate prediction block using the first motion vector,
generate a second intermediate prediction block using the second motion vector,
apply the first weight to the first intermediate prediction block to form a first weighted intermediate prediction block,
apply the second weight to the second intermediate prediction block to form a second weighted intermediate prediction block, and
combine the first weighted intermediate prediction block with the second weighted intermediate prediction block to form the first prediction block.

11. The device of claim 8, wherein the processing system is further configured to:
decode data representing a motion vector difference (MVD) resolution for the first motion vector and the second motion vector; and
determine that the third motion vector has the MVD resolution without decoding additional data representative of the MVD resolution for the third motion vector.

12. The device of claim 8, wherein to generate the final prediction block, the processing system is configured to:
determine a third weight and a fourth weight for the MHP mode;
apply the third weight to the first prediction block to form a first weighted prediction block;
apply the fourth weight to the second prediction block to form a second weighted prediction block; and
combine the first weighted prediction block with the second weighted prediction block to form the final prediction block.

13. The device of claim 12,
wherein to determine the third weight, the processing system is configured to:
decode an index value; and
determine the third weight to which the index value is mapped in a mapping table, and
wherein to determine the fourth weight, the processing system is configured to calculate the fourth weight as one minus the third weight.

14. The device of claim 8, wherein the processing system is configured to encode the current block using the final prediction block prior to decoding the current block.

15. The device of claim 8, further comprising a display configured to display decoded video data.

16. The device of claim 8, wherein the device comprises one or more of a camera, a computer, a mobile device, a broadcast receiver device, or a set-top box.

17. A non-transitory computer-readable storage medium having stored thereon instructions that, when executed, cause a processor to:
determine that a bitstream including video data includes data representing a first weight and a second weight for a current block of the video data that is inter-prediction coded using bi-prediction mode, wherein the data representing the first weight and the second weight indicates that the first weight is different than the second weight, and wherein the first weight and the second weight are to be used for the bi-prediction mode;
decode a first motion vector using advanced motion vector prediction (AMVP) mode for the bi-prediction mode;
decode a second motion vector using the AMVP mode for the bi-prediction mode;

in response to determining that the bitstream includes the data representing the first weight and the second weight and that the first weight is different than the second weight, determine whether the current block is to be predicted using multi-hypothesis prediction (MHP) mode with the bi-prediction mode as a base mode;

in response to determining that the current block is to be predicted using the MHP mode with the bi-prediction mode as the base mode, determine an additional inter-prediction mode of the MHP mode;

decode a third motion vector for the additional inter-prediction mode;

generate a first prediction block according to the bi-prediction mode using the first motion vector, the second motion vector, the first weight, and the second weight;

generate a second prediction block according to the additional inter-prediction mode using the third motion vector;

generate a final prediction block for the current block according to the MHP mode using the first prediction block and the second prediction block; and decode the current block using the final prediction block.

18. The non-transitory computer-readable storage medium of claim 17, wherein the instructions that cause the processor to determine whether the current block is to be predicted using MHP comprises instructions that cause the processor to determine that the current block is to be predicted using MHP when the first weight is not equal to 4 and the second weight is not equal to 4.

19. The non-transitory computer-readable storage medium of claim 17,
wherein the instructions that cause the processor to generate the first prediction block comprise instructions that cause the processor to:
generate a first intermediate prediction block using the first motion vector,
generate a second intermediate prediction block using the second motion vector,
apply the first weight to the first intermediate prediction block to form a first weighted intermediate prediction block,
apply the second weight to the second intermediate prediction block to form a second weighted intermediate prediction block, and
combine the first weighted intermediate prediction block with the second weighted intermediate prediction block to form the first prediction block.

20. The non-transitory computer-readable storage medium of claim 17, further comprising instructions that cause the processor to:
decode data representing a motion vector difference (MVD) resolution for the first motion vector and the second motion vector; and
determine that the third motion vector has the MVD resolution without decoding additional data representative of the MVD resolution for the third motion vector.

21. The non-transitory computer-readable storage medium of claim 17, wherein the instructions that cause the processor to generate the final prediction block comprise instructions that cause the processor to:
determine a third weight and a fourth weight for the MHP mode;
apply the third weight to the first prediction block to form a first weighted prediction block;
apply the fourth weight to the second prediction block to form a second weighted prediction block; and
combine the first weighted prediction block with the second weighted prediction block to form the final prediction block.

22. The non-transitory computer-readable storage medium of claim 21,
wherein the instructions that cause the processor to determine the third weight comprise instructions that cause the processor to:
decode an index value; and
determine the third weight to which the index value is mapped in a mapping table, and
wherein the instructions that cause the processor to determine the fourth weight comprise instructions that cause the processor to calculate the fourth weight as one minus the third weight.

23. The non-transitory computer-readable storage medium of claim 17, further comprising instructions that cause the processor to encode the current block using the final prediction block prior to decoding the current block.

24. A device for decoding video data, the device comprising:
means for determining that a bitstream including video data includes data representing a first weight and a second weight for a current block of the video data that is inter-prediction coded using bi-prediction mode, wherein the data representing the first weight and the second weight indicates that the first weight is different than the second weight, and wherein the first weight and the second weight are to be used for the bi-prediction mode;
means for decoding a first motion vector using advanced motion vector prediction (AMVP) mode for the bi-prediction mode;
means for decoding a second motion vector using the AMVP mode for the bi-prediction mode;
means for determining whether the current block is to be predicted using multi-hypothesis prediction (MHP) mode with the bi-prediction mode as a base mode in response to determining that the bitstream includes the data representing the first weight and the second weight and that the first weight is different than the second weight;
means for determining an additional inter-prediction mode of the MHP mode in response to determining that the current block is to be predicted using the MHP mode with the bi-prediction mode as the base mode;
means for decoding a third motion vector for the additional inter-prediction mode;
means for generating a first prediction block according to the bi-prediction mode using the first motion vector, the second motion vector, the first weight, and the second weight;
means for generating a second prediction block according to the additional inter-prediction mode using the third motion vector;
means for generating a final prediction block for the current block according to the MHP mode using the first prediction block and the second prediction block; and
means for decoding the current block using the final prediction block.

25. The device of claim 24, wherein the means for determining whether the current block is to be predicted using MHP comprises means for determining that the current block is to be predicted using MHP when the first weight is not equal to 4 and the second weight is not equal to 4.

26. The device of claim 24,
wherein the means for generating the first prediction block comprises:
means for generating a first intermediate prediction block using the first motion vector,
means for generating a second intermediate prediction block using the second motion vector,
means for applying the first weight to the first intermediate prediction block to form a first weighted intermediate prediction block,
means for applying the second weight to the second intermediate prediction block to form a second weighted intermediate prediction block, and
means for combining the first weighted intermediate prediction block with the second weighted intermediate prediction block to form the first prediction block.

27. The device of claim 24, further comprising:
means for decoding data representing a motion vector difference (MVD) resolution for the first motion vector and the second motion vector; and
means for determining that the third motion vector has the MVD resolution without decoding additional data representative of the MVD resolution for the third motion vector.

28. The device of claim 24, wherein the means for generating the final prediction block comprises:
means for determining a third weight and a fourth weight for the MHP mode;
means for applying the third weight to the first prediction block to form a first weighted prediction block;
means for applying the fourth weight to the second prediction block to form a second weighted prediction block; and
means for combining the first weighted prediction block with the second weighted prediction block to form the final prediction block.

29. The device of claim 28,
wherein the means for determining the third weight comprises:
means for decoding an index value; and
means for determining the third weight to which the index value is mapped in a mapping table, and
wherein the means for determining the fourth weight comprises means for calculating the fourth weight as one minus the third weight.

30. The device of claim 24, further comprising means for encoding the current block using the final prediction block prior to decoding the current block.

31. The method of claim 1, wherein the current block comprises a first block, the method further comprising:
determining that the bitstream does not include data representative of weights for a second block of the video data, the second block being different than the first block; and
in response to determining that the bitstream does not include data representative of the weights for the second block of the video data, determining that the second block is to be predicted using a prediction mode other than the MHP mode.

32. The device of claim 8, wherein the current block comprises a first block, and wherein the processing system is further configured to:
determine that the bitstream does not include data representative of weights for a second block of the video data, the second block being different than the first block; and
in response to determining that the bitstream does not include data representative of the weights for the second block of the video data, determine that the second block is to be predicted using a prediction mode other than the MHP mode.

33. The non-transitory computer-readable storage medium of claim 17, wherein the current block comprises a first block, further comprising instructions that cause the processor to:
determine that the bitstream does not include data representative of weights for a second block of the video data, the second block being different than the first block; and
in response to determining that the bitstream does not include data representative of the weights for the second block of the video data, determine that the second block is to be predicted using a prediction mode other than the MHP mode.

34. The device of claim 24, wherein the current block comprises a first block, further comprising:
means for determining that the bitstream does not include data representative of weights for a second block of the video data, the second block being different than the first block; and
means for determining that the second block is to be predicted using a prediction mode other than the MHP mode in response to determining that the bitstream does not include data representative of the weights for the second block of the video data.

* * * * *